(12) United States Patent
Ly et al.

(10) Patent No.: US 11,563,517 B2
(45) Date of Patent: Jan. 24, 2023

(54) MANAGING BROADCAST CHANNELS BASED ON BANDWIDTH

(71) Applicant: QUALCOMM Incorporated, San Diego, CA (US)

(72) Inventors: Hung Dinh Ly, San Diego, CA (US); Renqiu Wang, San Diego, CA (US); Krishna Kiran Mukkavilli, San Diego, CA (US); Huilin Xu, San Diego, CA (US); Seyedkianoush Hosseini, San Diego, CA (US); Tingfang Ji, San Diego, CA (US); Peter Pui Lok Ang, San Diego, CA (US); Alberto Rico Alvarino, San Diego, CA (US); Le Liu, Fremont, CA (US); Jing Lei, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 89 days.

(21) Appl. No.: 16/937,504

(22) Filed: Jul. 23, 2020

(65) Prior Publication Data

US 2021/0044380 A1 Feb. 11, 2021

Related U.S. Application Data

(60) Provisional application No. 62/884,605, filed on Aug. 8, 2019.

(51) Int. Cl.
*H04L 1/00* (2006.01)
*H04W 72/00* (2009.01)
*H04W 72/04* (2009.01)

(52) U.S. Cl.
CPC ......... *H04L 1/0054* (2013.01); *H04W 72/005* (2013.01); *H04W 72/042* (2013.01); *H04W 72/0453* (2013.01)

(58) Field of Classification Search
CPC ... H04L 1/0054; H04L 5/0053; H04L 5/0007; H04L 27/2666; H04W 72/005;
(Continued)

(56) References Cited

U.S. PATENT DOCUMENTS

2008/0082510 A1* 4/2008 Wang .................... H04H 60/40
2018/0279272 A1 9/2018 Bhattad et al.
(Continued)

OTHER PUBLICATIONS

International Search Report and Written Opinion—PCT/US2020/043562—ISAEPO—dated Nov. 19, 2020.
(Continued)

*Primary Examiner* — Dady Chery
(74) *Attorney, Agent, or Firm* — Holland & Hart LLP

(57) ABSTRACT

Methods, systems, and devices for wireless communications are described. A user equipment (UE) may receive signaling that configures a downlink bandwidth for a broadcast channel transmission (e.g., a physical downlink control channel transmission). The UE may determine a bandwidth of the capability is less than the downlink bandwidth, and monitor search space occasions in a period to receive samples of the broadcast channel. The period and the search space occasions may be associated with a control resource set and a search space set. The UE may receive the samples in non-overlapping subbands of the bandwidth according to the bandwidth capability, and detect the broadcast channel based on the samples. The UE may additionally monitor repeated transmission occasions in the period based on detecting the broadcast channel to detect a second broadcast channel (e.g., a physical downlink shared channel).

30 Claims, 28 Drawing Sheets

(58) Field of Classification Search
CPC . H04W 72/042; H04W 72/0453; H04W 4/70; H04W 28/06; H04W 48/12; H04W 72/1289; H04W 72/1273; H04J 11/0069; H04J 11/00; H04J 2211/005
See application file for complete search history.

(56) References Cited

U.S. PATENT DOCUMENTS

2019/0313437 A1* 10/2019 Jung ............... H04L 5/0042
2020/0187170 A1* 6/2020 Shin ................ H04W 4/70

OTHER PUBLICATIONS

Mediatek Inc: "Further Details on Wider Bandwidth Operations in NR", 3GPP Draft, 3GPP TSG RAN WG1 NR Ad-Hoc#2, R1 -17010796 Further Details on Wider Bandwidth Operations in NR, 3rd Generation Partnership Project (3GPP), Mobile Competence Centre, 650, Route Des Lucioles, F-06921 Sophia-Antipolis Ced, vol. RAN WG1, No. Qingdao, P.R. China, Jun. 27, 2017-Jun. 30, 2017, Jun. 26, 2017 (Jun. 26, 2017), XP051300000, 7 pages, Retrieved from the Internet: URL: http://www.3gpp.org/ftp/Meetings_ 3GPP_SYNC/RAN1/Docs/, [retrieved on Jun. 26, 2017], Subsection 2.2.
Samsung: "Summary on A.I. 7.1.2.3: Remaining Details on Other System Information Delivery", 3GPP Draft, 3GPP TSG RAN WG1 Meeting AH 1801, R1 -1801086 AI 7.1.2.3 OSI Summary After Mon, 3rd Generation Partnership Project (3GPP), Mobile Competence Centre, 650, Route Des Lucioles, F-06921 Sophia-Antipolis Cedex, France, vol. RAN WG1. No. Vancouver, Canada, Jan. 22, 2018-Jan. 26, 2018, Jan. 25, 2018 (Jan. 25, 2018), XP051385325, 5 Pages Retrieved from the Internet: URL: http://www.3gpp.org/ftp/tsg%5Fran/WG1%5FRL1/TSGR1%5FAH/NR%5FAH%5F1801/Docs/, [retrieved on Jan. 25, 2018], Section 3.

* cited by examiner

MANAGING BROADCAST CHANNELS BASED ON BANDWIDTH

CROSS REFERENCE

The present Application for Patent claims the benefit of U.S. Provisional Patent Application No. 62/884,605 by LY et al., entitled "MANAGING BROADCAST CHANNELS BASED ON BANDWIDTH," filed Aug. 8, 2019, assigned to the assignee hereof, and expressly incorporated by reference herein.

FIELD OF TECHNOLOGY

The following relates generally to wireless communications and more specifically to managing broadcast channels based on bandwidth.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include base stations or network access nodes, each simultaneously supporting communication for multiple communication devices, which may be otherwise known as user equipment (UE). Some wireless communications systems may support communication between base stations and UEs with various capabilities. Base stations may transmit broadcast channels to UEs, and UEs may perform channel detection processes for decoding and receiving information in the broadcast channels. As demand for UE efficiency increases, however, some wireless communications system may fail to manage broadcast channel transmissions for UEs with differing capabilities.

SUMMARY

The described techniques relate to improved methods, systems, devices, and apparatuses that support managing broadcast channels based on bandwidth. Generally, the described techniques provide for a user equipment (UE) receiving a signal that configures a downlink bandwidth for a broadcast channel transmission (e.g., a physical downlink control channel (PDCCH) transmission). The UE may determine that its bandwidth capability is less than the downlink bandwidth. As a result, the UE may monitor search space occasions in a period to receive samples of the broadcast channel. The period and the search space occasions may be associated with a control resource set and a search space set. The UE may receive the samples in non-overlapping subbands of the bandwidth according to the bandwidth capability, and detect the broadcast channel based on the samples. The UE may additionally monitor repeated transmission occasions in the period based on detecting the broadcast channel to detect a second broadcast channel (e.g., a physical downlink shared channel (PDSCH)).

A method of wireless communications at a UE is described. The method may include receiving a signal configuring a downlink bandwidth of a broadcast channel, determining a bandwidth capability of the UE is less than the downlink bandwidth of the broadcast channel, monitoring one or more search space occasions in a period based on the bandwidth capability, receiving one or more samples of the broadcast channel in the search space occasions, and detecting the broadcast channel based on the samples.

An apparatus for wireless communications at a UE is described. The apparatus may include a processor, memory coupled with the processor, and instructions stored in the memory. The instructions may be executable by the processor to cause the apparatus to receive a signal configuring a downlink bandwidth of a broadcast channel, determine a bandwidth capability of the UE is less than the downlink bandwidth of the broadcast channel, monitor one or more search space occasions in a period based on the bandwidth capability, receive one or more samples of the broadcast channel in the search space occasions, and detect the broadcast channel based on the samples.

Another apparatus for wireless communications at a UE is described. The apparatus may include means for receiving a signal configuring a downlink bandwidth of a broadcast channel, determining a bandwidth capability of the UE is less than the downlink bandwidth of the broadcast channel, monitoring one or more search space occasions in a period based on the bandwidth capability, receiving one or more samples of the broadcast channel in the search space occasions, and detecting the broadcast channel based on the samples.

A non-transitory computer-readable medium storing code for wireless communications at a UE is described. The code may include instructions executable by a processor to receive a signal configuring a downlink bandwidth of a broadcast channel, determine a bandwidth capability of the UE is less than the downlink bandwidth of the broadcast channel, monitor one or more search space occasions in a period based on the bandwidth capability, receive one or more samples of the broadcast channel in the search space occasions, and detect the broadcast channel based on the samples.

In some examples of the method, apparatuses, and non-transitory computer-readable medium described herein, receiving the samples may include operations, features, means, or instructions for receiving a first sample in a first subband of the downlink bandwidth in a first search space occasion, and receiving a second sample in a second subband of the downlink bandwidth in a second search space occasion, where the first subband fails to overlap the second subband. Some examples of the method, apparatuses, and non-transitory computer-readable medium described herein may further include operations, features, means, or instructions for receiving a second signal identifying one or more parameters of the period, or the search space occasions, or a combination thereof.

In some examples of the method, apparatuses, and non-transitory computer-readable medium described herein, detecting the broadcast channel further may include operations, features, means, or instructions for detecting the broadcast channel based on an assumption that a same channel candidate is used to transmit a same downlink control information over consecutive search space occasions in the period associated with a search space set and a control resource set.

Some examples of the method, apparatuses, and non-transitory computer-readable medium described herein may further include operations, features, means, or instructions for decoding the broadcast channel based on the detecting. Some examples of the method, apparatuses, and non-transitory computer-readable medium described herein may further include operations, features, means, or instructions for identifying a frequency domain resource allocation for a second broadcast channel based on decoding the broadcast channel, monitoring one or more transmission occasions in the period on frequency resources of the frequency domain resource allocation, receiving one or more samples of the second broadcast channel in the transmission occasions in the period, and decoding the second broadcast channel based on the samples of the second broadcast channel.

Some examples of the method, apparatuses, and non-transitory computer-readable medium described herein may further include operations, features, means, or instructions for identifying one or more parameters associated with the transmission occasions. In some examples of the method, apparatuses, and non-transitory computer-readable medium described herein, the parameters include a transport block size, a channel coding, a redundancy version, or a combination thereof. Some examples of the method, apparatuses, and non-transitory computer-readable medium described herein may further include operations, features, means, or instructions for descrambling a log-likelihood ratio associated with the second broadcast channel based on the parameters.

In some examples of the method, apparatuses, and non-transitory computer-readable medium described herein, receiving the samples of the second broadcast channel may include operations, features, means, or instructions for receiving a first sample in a first subband of the frequency resources in a first transmission occasion, and receiving a second sample in a second subband of the frequency resources in a second transmission occasion, where the first subband fails to overlap the second subband. Some examples of the method, apparatuses, and non-transitory computer-readable medium described herein may further include operations, features, means, or instructions for identifying a duration between transmitting a first search space occasion and a first transmission occasion based on decoding the broadcast channel.

Some examples of the method, apparatuses, and non-transitory computer-readable medium described herein may further include operations, features, means, or instructions for receiving the samples of the second broadcast channel based on an assumption that consecutive transmission occasions in the period are transmitted in the same frequency domain resource allocation for the second broadcast channel. Some examples of the method, apparatuses, and non-transitory computer-readable medium described herein may further include operations, features, means, or instructions for decoding the second broadcast channel based on an assumption that the second broadcast channel is repeatedly transmitted over consecutive transmission occasions in the period. In some examples of the method, apparatuses, and non-transitory computer-readable medium described herein, the second broadcast channel includes a broadcast PDSCH.

In some examples of the method, apparatuses, and non-transitory computer-readable medium described herein, the search space occasions may be associated with a control resource set, a search space set, or a combination thereof. In some examples of the method, apparatuses, and non-transitory computer-readable medium described herein, detecting the broadcast channel further may include operations, features, means, or instructions for detecting the broadcast channel based on channel candidates associated with the control resource set, the search space set, or a combination thereof. In some examples of the method, apparatuses, and non-transitory computer-readable medium described herein, a first search space occasion may have a first resource element mapping based on the downlink bandwidth, and a second search space occasion may have a second resource element mapping based on the bandwidth capability of the UE.

In some examples of the method, apparatuses, and non-transitory computer-readable medium described herein, the period may be based on a quantity of the search space occasions, a system information modification period, a discontinuous reception cycle for paging, the downlink bandwidth, a random access channel (RACH) configuration period, a RACH configuration association period, or a combination thereof. In some examples of the method, apparatuses, and non-transitory computer-readable medium described herein, the broadcast channel includes a broadcast PDCCH. In some examples of the method, apparatuses, and non-transitory computer-readable medium described herein, the signal includes a master information block (MIB) or a system information block (SIB). In some examples of the method, apparatuses, and non-transitory computer-readable medium described herein, the broadcast channel indicates system information, paging information, one or more messages in a RACH procedure, or a combination thereof.

A method of wireless communications is described. The method may include transmitting a signal configuring a downlink bandwidth of a broadcast channel to a UE, determining a period including one or more search space occasions for transmission of the broadcast channel, mapping the broadcast channel to resource elements in each search space occasion in the period, and transmitting the broadcast channel in each search space occasion in the period based on the mapping.

An apparatus for wireless communications is described. The apparatus may include a processor, memory coupled with the processor, and instructions stored in the memory. The instructions may be executable by the processor to cause the apparatus to transmit a signal configuring a downlink bandwidth of a broadcast channel to a UE, determine a period including one or more search space occasions for transmission of the broadcast channel, map the broadcast channel to resource elements in each search space occasion in the period, and transmit the broadcast channel in each search space occasion in the period based on the mapping.

Another apparatus for wireless communications is described. The apparatus may include means for transmitting a signal configuring a downlink bandwidth of a broadcast channel to a UE, determining a period including one or more search space occasions for transmission of the broadcast channel, mapping the broadcast channel to resource elements in each search space occasion in the period, and transmitting the broadcast channel in each search space occasion in the period based on the mapping.

A non-transitory computer-readable medium storing code for wireless communications is described. The code may include instructions executable by a processor to transmit a signal configuring a downlink bandwidth of a broadcast channel to a UE, determine a period including one or more search space occasions for transmission of the broadcast channel, map the broadcast channel to resource elements in each search space occasion in the period, and transmit the broadcast channel in each search space occasion in the period based on the mapping.

Some examples of the method, apparatuses, and non-transitory computer-readable medium described herein may further include operations, features, means, or instructions for transmitting a second signal identifying one or more parameters of the period, or the search space occasions, or a combination thereof, to the UE. In some examples of the method, apparatuses, and non-transitory computer-readable medium described herein, the mapping further may include operations, features, means, or instructions for mapping downlink control information of the broadcast channel to a same channel candidate of the broadcast channel in each search space occasion in the period.

Some examples of the method, apparatuses, and non-transitory computer-readable medium described herein may further include operations, features, means, or instructions for transmitting, in the broadcast channel, a frequency domain resource allocation for a second broadcast channel, and transmitting the second broadcast channel in one or more transmission occasions in the period on frequency resources of the frequency domain resource allocation.

Some examples of the method, apparatuses, and non-transitory computer-readable medium described herein may further include operations, features, means, or instructions for determining one or more parameters associated with the transmission occasions. In some examples of the method, apparatuses, and non-transitory computer-readable medium described herein, the parameters include a transport block size, a channel coding, a redundancy version, or a combination thereof. Some examples of the method, apparatuses, and non-transitory computer-readable medium described herein may further include operations, features, means, or instructions for determining a duration between transmitting a first search space occasion and a first transmission occasion.

Some examples of the method, apparatuses, and non-transitory computer-readable medium described herein may further include operations, features, means, or instructions for transmitting consecutive transmission occasions in the period in the same frequency domain resource allocation. Some examples of the method, apparatuses, and non-transitory computer-readable medium described herein may further include operations, features, means, or instructions for transmitting repetitions of the second broadcast channel in consecutive transmission occasions in the period. In some examples of the method, apparatuses, and non-transitory computer-readable medium described herein, the second broadcast channel includes a broadcast PDSCH.

Some examples of the method, apparatuses, and non-transitory computer-readable medium described herein may further include operations, features, means, or instructions for mapping the broadcast channel to resource elements in a first search space occasion based on the downlink bandwidth, and mapping the broadcast channel to resource elements in a second search space occasion based on a bandwidth capability of the UE. In some examples of the method, apparatuses, and non-transitory computer-readable medium described herein, the search space occasions may be associated with a control resource set, a search space set, or a combination thereof.

In some examples of the method, apparatuses, and non-transitory computer-readable medium described herein, the period may be determined based on a quantity of the search space occasions, a system information modification period, a discontinuous reception cycle for paging, the downlink bandwidth, a RACH configuration period, a RACH configuration association period, or a combination thereof. In some examples of the method, apparatuses, and non-transitory computer-readable medium described herein, the broadcast channel includes a broadcast PDCCH. In some examples of the method, apparatuses, and non-transitory computer-readable medium described herein, the signal includes a MIB or a SIB. In some examples of the method, apparatuses, and non-transitory computer-readable medium described herein, the broadcast channel indicates system information, paging information, one or more messages in a RACH procedure, or a combination thereof.

DETAILED DESCRIPTION

Figure 1:
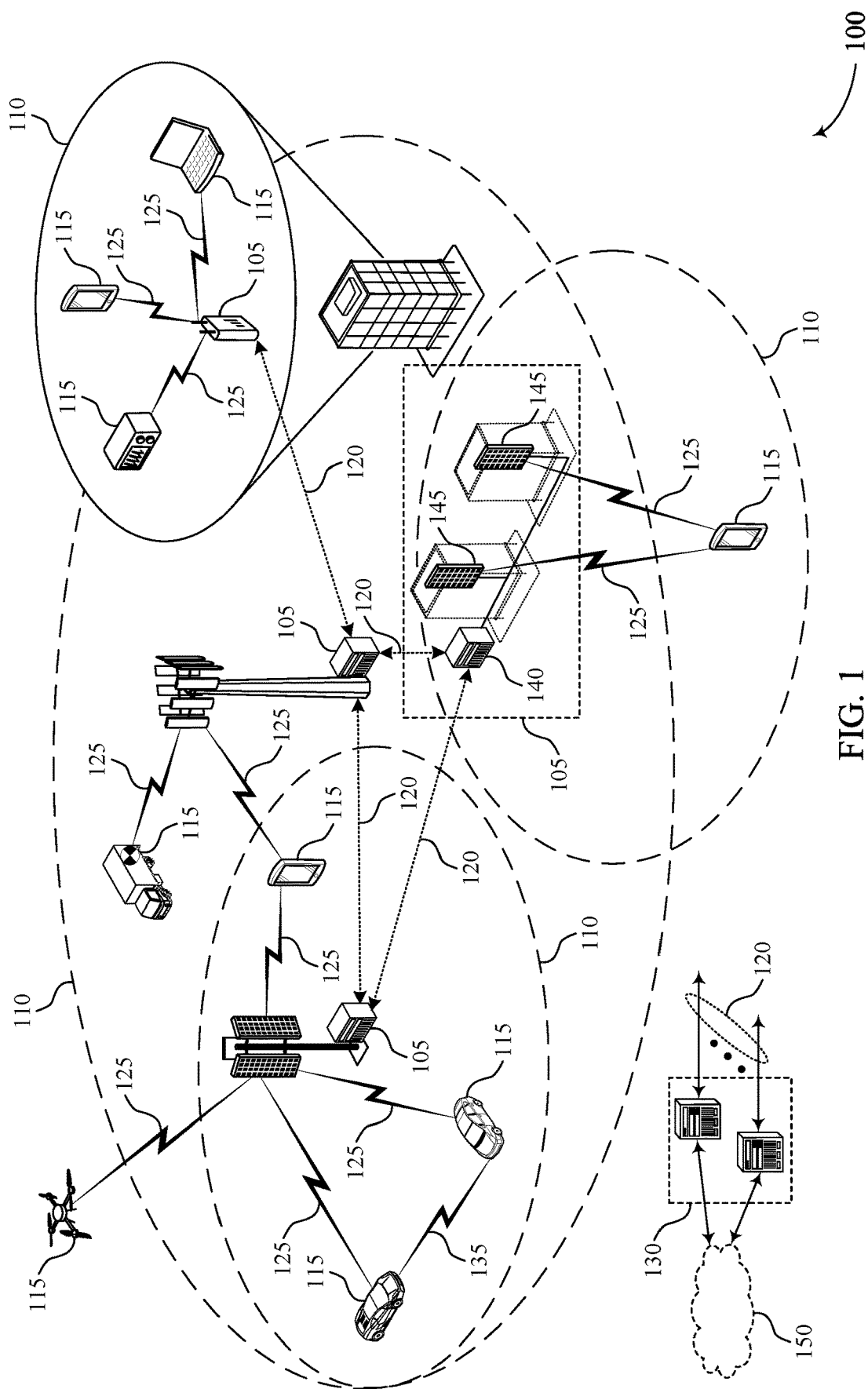
FIGS. 1 and 2 illustrate examples of a system for wireless communications that supports managing broadcast channels based on bandwidth in accordance with aspects of the present disclosure.

Some wireless communication systems may have one or more user equipments (UEs) and one or more base stations, for example, next-generation NodeBs or giga-NodeBs (either of which may be referred to as a gNB) that may support one or more multiple radio access technologies including 4G systems such as Long Term Evolution (LTE) systems, fifth generation (5G) systems which may be referred to as New Radio (NR) systems, and Wi-Fi systems (e.g., wireless local area network (WLAN) systems). UEs in a wireless communications system may be specialized for particular uses, such as wearable devices, industrial sensors, video monitoring equipment, Internet of Things (IoT) devices, etc. Such specialized devices, which may be referred to as NR-Light UEs, may have reduced capabilities, such as bandwidth capabilities, compared to other UEs in the wireless communications system, to improve efficiency and provide other benefits. For example, an NR-Light UE may be capable of monitoring a 10 megahertz (MHz) bandwidth, and other UEs may be capable of monitoring a 100 MHz bandwidth or larger.

A base station may transmit broadcast channels (e.g., for system information, paging) to UEs in a coverage area. Broadcast channels may include a physical downlink control channel (PDCCH) and a physical downlink shared channel (PDSCH), among others. The UEs may share the same synchronization signal block (SSB). The base station may configure a bandwidth of a downlink bandwidth part (BWP) for transmitting the broadcast channels, and signal the configuration to the UEs, for example in a master information block (MIB). In some cases, the configured downlink bandwidth may be larger than a bandwidth capability of a UE. For example, the downlink bandwidth may be 17 MHz, and the UE may have a bandwidth capability of 10 MHz. Additionally, the downlink bandwidth may be reconfigured in a subsequent system information block (SIB), such as a SystemInformationBlockType1 (SIB1). The reconfigured downlink bandwidth may be larger than the downlink bandwidth configured in the MIB. If the downlink bandwidth is greater than the bandwidth capability of a UE (e.g., an NR-Light UE), the UE may be unable to successfully detect or decode the broadcast channel, which may lead to degraded performance or efficiency.

Techniques are described herein to enable a broadcast channel design supporting the coexistence of UEs with reduced bandwidth capabilities (e.g., NR-Light UEs) with other UEs. A UE may receive a signal (e.g., a MIB) from a base station configuring a downlink bandwidth for a broadcast channel (e.g., a PDCCH), and determine that the bandwidth capability of the UE is less than the signaled downlink bandwidth. The base station may determine a period in which the broadcast channel is repeated in multiple search space occasions. The period and the search space occasions may be associated with a control resource set (CORESET) and a search space set. In some examples, the base station may explicitly signal the period to the UE, for example in system information. The UE may capture samples in subbands of the downlink bandwidth according to the bandwidth capability of the UE in multiple search space occasions. In some examples, the UE may capture the samples in non-overlapping subbands in the search space occasions. When the UE has captured a number of samples, the UE may detect the broadcast channel according to candidates of the channel associated with the CORESET and the search space set. For a given CORESET and search space set, the UE may assume the base station uses the same channel candidate to transmit the same downlink control information (DCI) in each search space occasion in the period.

The base station may determine the period over which the broadcast channel is repeated in search space occasions based on a number of parameters. For example, the period may correspond to or be a function of a system information modification period, a discontinuous reception (DRX) cycle (e.g., for paging), or a configuration and/or configuration association period for a random access channel (RACH) procedure. In some cases, the base station may determine the period based on a determined quantity of search space occasions in the period. In some examples, the period may be a function of the configured downlink bandwidth.

In some examples, the base station may transmit additional search space occasions to be monitored by UEs with reduced bandwidth capabilities. These additional search space occasions (which may be referred to as narrowband repetitions of the broadcast channel) may overlap with other search space occasions, but the base station may apply different or additional scrambling such that other UEs (e.g., UEs without reduced bandwidth capabilities) are unable to detect or decode the additional search space occasions. The bandwidth of the additional search space occasions may be less than the configured downlink bandwidth, and in some examples may be based on the bandwidth capabilities of the UEs. In such cases, the UE may avoid retuning between search space occasions to monitor non-overlapping subbands. In some examples, the mapping of resource elements in the additional search space occasions may be different from the mapping of resource elements in the other search space occasions.

Techniques are also described herein to enable a UE with reduced bandwidth capability to decode or demodulate a second broadcast channel (e.g., a PDSCH) indicated by a first broadcast channel (e.g., a PDCCH). Similar to the process for detecting the first broadcast channel, the base station may transmit multiple transmission (or retransmission) occasions including the second broadcast channel in the downlink transmission period. The UE may identify a frequency domain resource allocation for the second broadcast channel when it decodes the first broadcast channel. The UE may also identify a timing parameter (e.g., a K0 parameter) which defines the time between transmission of the first broadcast channel and transmission of the second broadcast channel. The UE may capture samples of the second broadcast channel in subbands of the allocation (which may be non-overlapping in some examples) according to the bandwidth capability of the UE in multiple transmission occasions. After the UE has captured a number of samples, the UE may decode or demodulate the second broadcast channel.

The UE may assume that over the period, a number of parameters are the same for each transmission occasion. For example, the UE may assume that each transmission occasion is transmitted in the same frequency domain resource allocation, and the same transport block size, channel coding, and redundancy version are used for the second broadcast channel in each transmission occasion of the period. Based on this assumption, the UE may descramble a log-likelihood ratio for the second broadcast channel in addition to decoding the second broadcast channel.

Particular aspects of the subject matter described herein may be implemented to realize one or more advantages. The described techniques may support improvements in power savings, among other advantages. As such, supported techniques may include improved UE operations and, in some examples, may promote UE efficiencies, among other benefits. Aspects of the disclosure are initially described in the context of wireless communications systems. Additional examples of channel detection processes, timing diagrams, and a process flow are then discussed. Aspects of the disclosure are further illustrated by and described with reference to apparatus diagrams, system diagrams, and flowcharts that relate to managing broadcast channels based on bandwidth.

FIG. 1 illustrates an example of a wireless communications system 100 that supports managing broadcast channels based on bandwidth in accordance with aspects of the present disclosure. The wireless communications system 100 may include base stations 105, UEs 115, and a core network 130. In some examples, the wireless communications system 100 may be an LTE network, an LTE-Advanced (LTE-A) network, an LTE-A Pro network, or an NR network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a BWP) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 MHz to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 (e.g., a gNB in an NR system) may transmit a signal (e.g., a MIB) configuring a downlink bandwidth of a broadcast channel (e.g., a PDCCH) to a UE 115. The base station 105 may determine to transmit repetitions of the broadcast channel in search space occasions within a period. In some examples, the base station 105 may transmit signaling to the UE 115 identifying the period. The base station 105 may transmit DCI in a same channel candidate in each search space occasion according to a CORESET and search space set associated with the search space occasions. In some examples, the base station 105 may include a frequency domain resource allocation for a second broadcast channel (e.g., a PDSCH) in the broadcast channel. The base station 105 may transmit repetitions of the second broadcast channel in transmission occasions within the period, where each transmission occasion is transmitted a duration after a respective search space occasion based on a timing parameter (e.g., a K0 parameter).

The UE 115 may receive the signal configuring the downlink bandwidth for the broadcast channel from the base station 105. The UE 115 may determine that a bandwidth capability of the UE 115 is less than the downlink bandwidth. The UE 115 may identify a period (for example, by receiving signaling from the base station 105) including search space occasions with repeated instances of the broadcast channel, and determine to monitor the search space occasions. The UE 115 may capture samples of the broadcast channel in the search space occasions, and detect the broadcast channel based on capturing the samples. In some examples, the UE 115 may capture samples based on the DCI being mapped to the same channel candidate in each search space occasion.

In some examples, the UE 115 may identify the frequency domain resource allocation for the second broadcast channel based on decoding the first broadcast channel. The UE 115 may monitor consecutive transmission occasions in the frequency domain resource allocation and capture samples of the second broadcast channel to decode the second broadcast channel. The wireless communications system 100 may therefore include features for improved power savings and, in some examples, may promote improved channel detection efficiencies, among other benefits.

Figure 2:
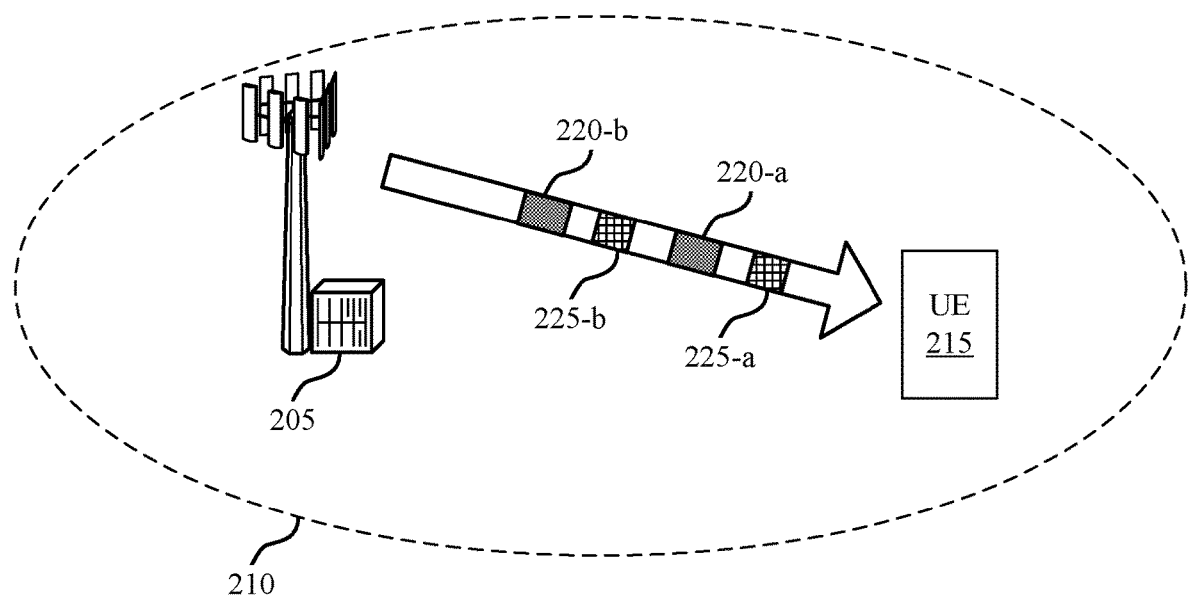
Figure 2:
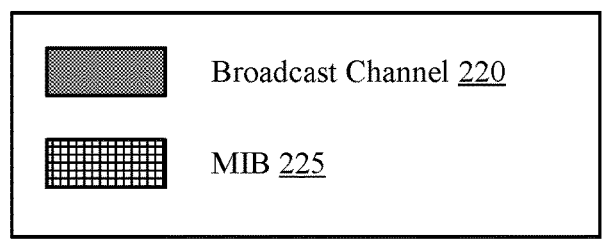

FIG. 2 illustrates an example of a wireless communications system 200 that supports managing broadcast channels based on bandwidth in accordance with aspects of the present disclosure. In some examples, wireless communications system 200 may implement aspects of the wireless communication system 100. For example, the wireless communications system 200 may include a base station 205 and a UE 215, which may be examples of the corresponding devices described with reference to FIG. 1. The wireless communications system 200 may include features for improved UE operations, among other benefits.

In the wireless communications system 200 the base station 205 may provide a geographic coverage area 210. The base station 205 may configure and transmit broadcast channels 220 to the UE 215. The base station 205 may configure a downlink bandwidth for each broadcast channel 220 in signaling such as a MIB 225. The UE 215 may determine that a bandwidth capability of the UE 215 is less than the downlink bandwidth of the broadcast channel 220 configured in the MIB 225. The UE 215 may determine that repetitions of the broadcast channel 220 may be transmitted in multiple search space occasions in a period. The period and the search space occasions may be associated with a CORESET and a search space set. In some examples, the base station 205 may explicitly signal the period to the UE 215, for example in system information.

The UE 215 may monitor the search space occasions in the period to capture samples of the broadcast channel 220. In some examples, the UE 215 may capture samples in non-overlapping subbands of the downlink bandwidth according to the bandwidth capability of the UE 215 by retuning to monitor different subbands between search space occasions. When the UE 215 has captured a number of samples, the UE 215 may detect the broadcast channel 220 according to candidates of the broadcast channel 220 associated with the CORESET and the search space set. In some examples, the UE 215 may combine the samples to detect and/or decode the broadcast channel 220.

In some examples, the base station 205 may transmit repetitions of the broadcast channel 220 in narrowband search space occasions. In such examples, the UE 215 may avoid the retuning between search space occasions and monitor consecutive narrowband search space occasions in a single subband, for example in a subband signaled by the base station 205.

Figure 3:
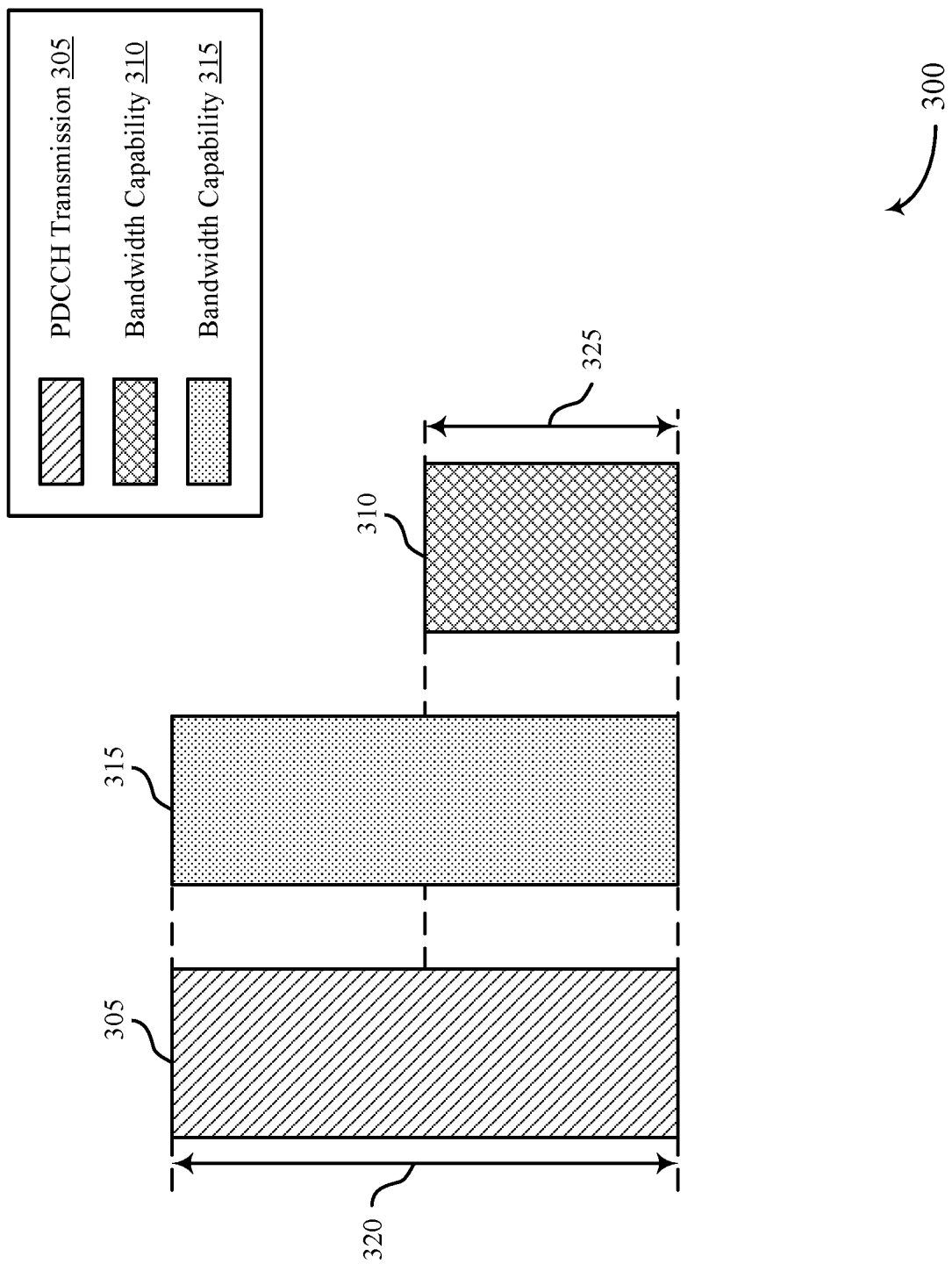
FIG. 3 illustrates an example of a channel detection process that supports managing broadcast channels based on bandwidth in accordance with aspects of the present disclosure.

FIG. 3 illustrates an example of a channel detection process 300 that supports managing broadcast channels based on bandwidth in accordance with aspects of the present disclosure. In some examples, channel detection process 300 may implement aspects of the wireless communication systems 100 and 200. The channel detection process 300 may be associated with one or more UEs, which may be examples of corresponding devices described with reference to FIGS. 1 and 2. The channel detection process 300 may include features for improved UE operations, among other benefits.

A number of UEs may receive signaling that configures a downlink bandwidth 320 for transmission of a broadcast channel such as a PDCCH transmission 305. Each UE may identify an associated bandwidth capability. For example, a first UE may have a bandwidth capability 310, meaning the first UE may be capable of monitoring a bandwidth 325 (which is less than the bandwidth 320) during a given PDCCH transmission 305. A second UE may have a bandwidth capability 315, meaning the second UE may be capable of monitoring the full bandwidth 320 during the PDCCH transmission 305. Thus, if a single PDCCH transmission 305 is transmitted, the first UE may fail to detect and decode the PDCCH transmission 305 while the second UE may succeed in detecting and decoding the PDCCH transmission 305.

A wireless communications system may support the coexistence of UEs with reduced bandwidth capabilities (e.g., the first UE, or NR-Light UEs) with other UEs (e.g., the second UE) by transmitting repetitions of the PDCCH transmission 305 in multiple search space occasions. The first UE may retune between search space occasions according to the bandwidth capability 310 in order to capture samples in subbands (e.g., corresponding to the bandwidth 325) in order to detect and decode the PDCCH transmission 305. The described techniques may support improvements in channel detection efficiencies for UEs with reduced bandwidth capabilities.

Figure 4:
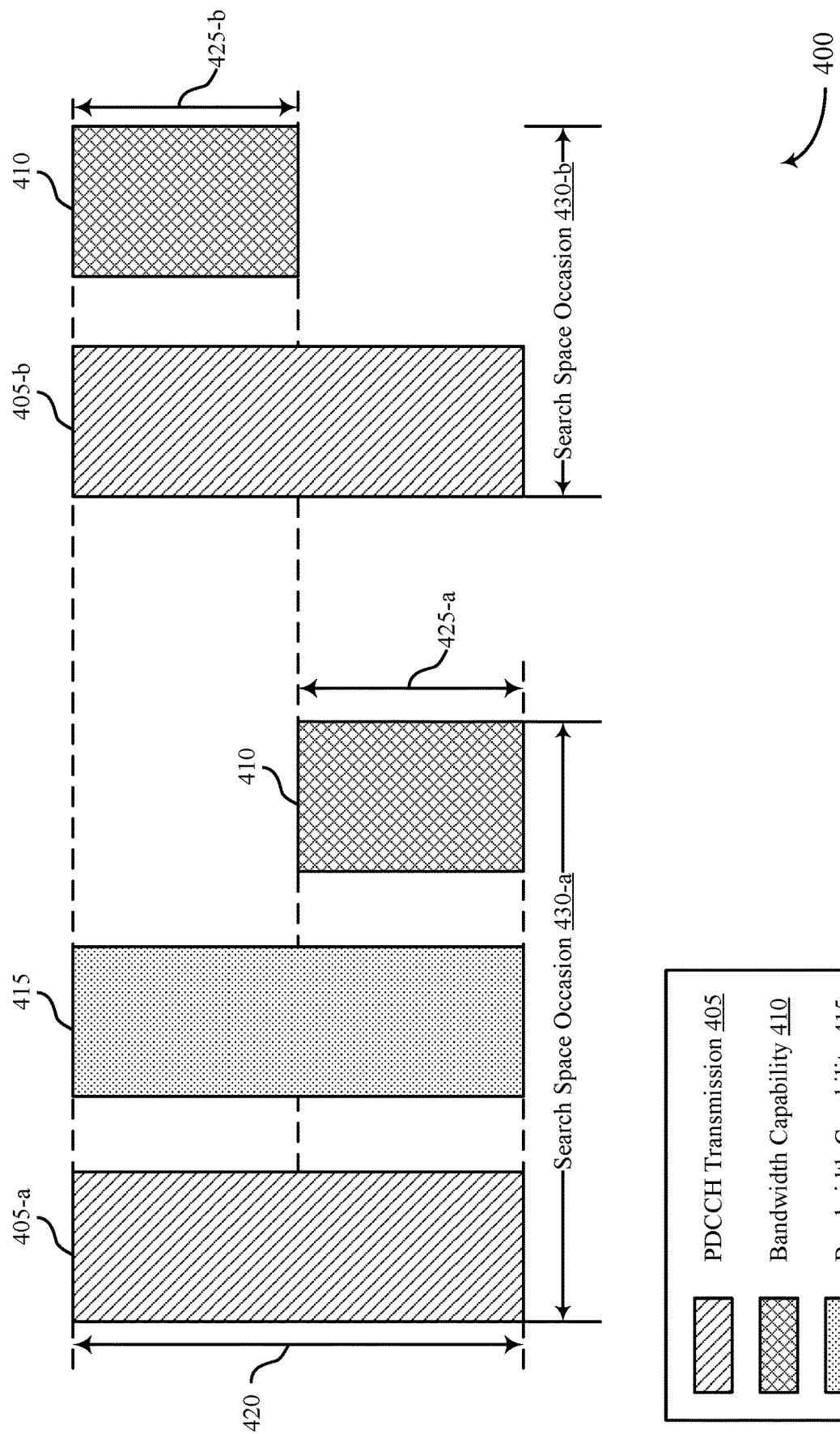
FIG. 4 illustrates an example of a channel detection process that supports managing broadcast channels based on bandwidth in accordance with aspects of the present disclosure.

FIG. 4 illustrates an example of a channel detection process 400 that supports managing broadcast channels based on bandwidth in accordance with aspects of the present disclosure. In some examples, channel detection process 400 may implement aspects of the wireless communication systems 100 and 200. The channel detection process 400 may be associated with one or more UEs, which may be examples of corresponding devices described with reference to FIGS. 1 and 2. The channel detection process 400 may include features for improved UE operations, among other benefits.

A number of UEs may receive signaling that configures a downlink bandwidth 420 for transmission of a broadcast channel such as a PDCCH transmission 405. Each UE may identify an associated bandwidth capability. For example, a first UE may have a bandwidth capability 410, meaning the first UE may be capable of monitoring a bandwidth 425 (which is less than the bandwidth 420) during a given PDCCH transmission 405. A second UE may have a bandwidth capability 415, meaning the second UE may be capable of monitoring the full bandwidth 420 during the PDCCH transmission 405. Thus, if a single PDCCH transmission 405 is transmitted, the first UE may fail to detect and decode the PDCCH transmission 405 while the second UE may succeed in detecting and decoding the PDCCH transmission 405.

A wireless communications system may support the coexistence of UEs with reduced bandwidth capabilities (e.g., the first UE, or NR-Light UEs) with other UEs (e.g., the second UE) by transmitting repetitions of the PDCCH transmission 405 in multiple search space occasions 430. As illustrated in FIG. 4, in a first search space occasion 430-*a*, the first UE may monitor a bandwidth 425-*a* corresponding to the bandwidth capability 410 to capture a first sample of the PDCCH transmission 405-*a*. Before a second search space occasion 430-*b*, the first UE may retune components such that the first UE may monitor a bandwidth 425-*b* corresponding to the bandwidth capability 410. In some examples, the bandwidth 425-*b* may not overlap with the bandwidth 425-*a*. In the second search space occasion 430-*b*, the first UE may monitor the bandwidth 425-*b* to capture a second sample of the PDCCH transmission 405-*b*. The PDCCH transmission 405-*b* may be identical to the PDCCH transmission 405-*a*. For example, the first UE may assume that a same PDCCH candidate in each PDCCH transmission 405 includes the same DCI in each search space occasion 430 of a period.

In subsequent search space occasions 430 of the period, the first UE may capture additional samples in additional bandwidths 425. When the first UE has captured a number of samples, the UE may detect the broadcast PDCCH transmission 405 according to PDCCH candidates associated with a CORESET and a search space set. The first UE may then decode and process the broadcast PDCCH transmission 405.

Figure 5:
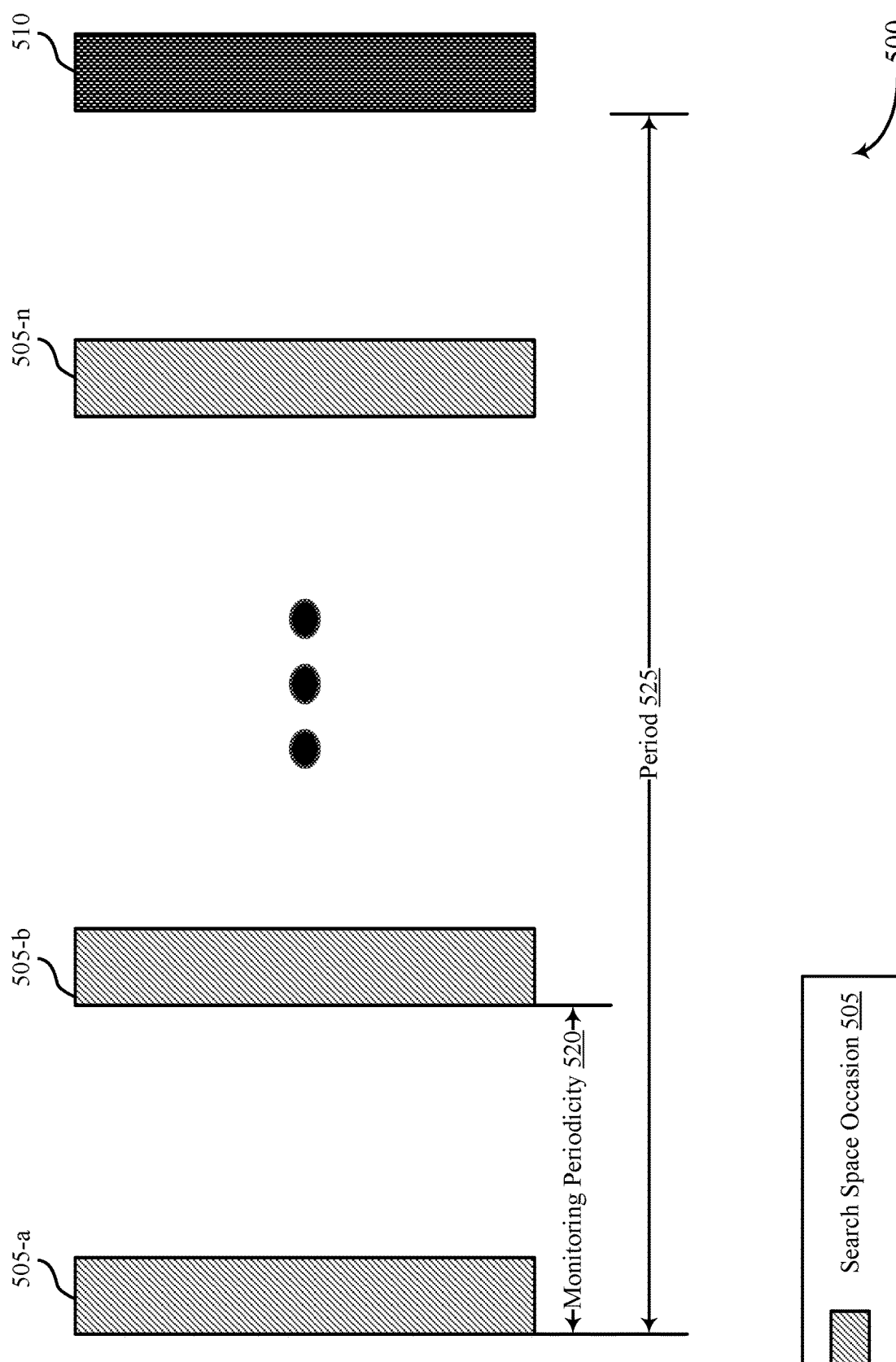
FIG. 5 illustrates an example of a timing diagram that supports managing broadcast channels based on bandwidth in accordance with aspects of the present disclosure.

FIG. 5 illustrates an example of a timing diagram 500 that supports managing broadcast channels based on bandwidth in accordance with aspects of the present disclosure. In some examples, timing diagram 500 may implement aspects of the wireless communication systems 100 and 200. The timing diagram 500 may be associated with communications between a UE and a base station, which may be examples of corresponding devices described with reference to FIGS. 1 and 2.

A UE may monitor search space occasions 505 within a period 525 to detect and decode a broadcast channel transmission such as a PDCCH transmission. The period 525 and the search space occasions 505 may be associated with a PDCCH search set and a CORESET. For a given PDCCH search set and CORESET, the UE may assume that a same PDCCH candidate is used to transmit a same DCI across all search space occasions 505 in the period 525. Additional search space occasions outside the period 525, such as a search space occasion 510, may be configured to the UE separately, for example by separate signaling.

The UE may monitor the search space occasions 505 according to a monitoring periodicity 520. That is, the monitoring periodicity 520 may correspond to a duration between a beginning of two consecutive search space occasions 505, such as a search space occasion 505-*a* and a search space occasion 505-*b*. The period 525 may include a quantity of repetitions of the search space occasion 505, which may include the search space occasion 505-*a*, the search space occasion 505-*b*, up to a search space occasion 505-*n*.

The UE may determine the period 525 (e.g., a duration of the period 525, time and frequency resources in which the period 525 is received) in which to monitor the search space occasion 505 based on one or more parameters. For example, the period 525 may correspond to or be a function of a system information modification period, a DRX cycle (e.g., for paging), or a configuration and/or configuration association period for a RACH procedure. In some cases, the period 525 may be based on a determined quantity of search space occasions 505 in the period 525. In some examples, the period 525 may be a function of the downlink bandwidth configured for transmission of the broadcast channel. In some examples, the period 525 may be explicitly signaled to the UE by a base station, for example in system information.

The UE may monitor a number of the search space occasions 505 in the period 525 to capture samples of the broadcast channel in order to detect and decode the broadcast channel. As such, these techniques may improve UE channel detection efficiencies, among other benefits.

Figure 6:
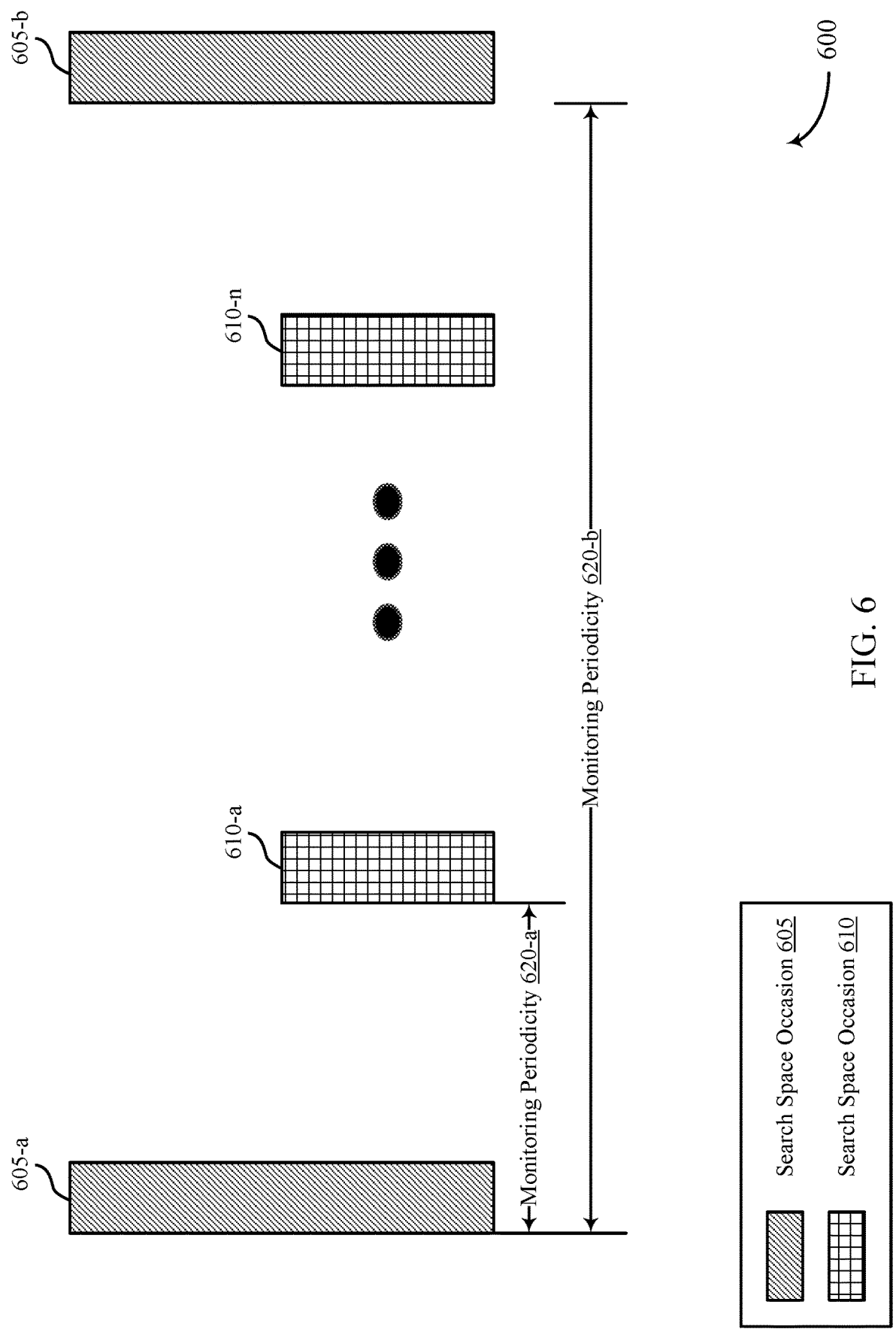
FIG. 6 illustrates an example of a timing diagram that supports managing broadcast channels based on bandwidth in accordance with aspects of the present disclosure.

FIG. 6 illustrates an example of a timing diagram 600 that supports managing broadcast channels based on bandwidth in accordance with aspects of the present disclosure. In some examples, timing diagram 600 may implement aspects of the wireless communication systems 100 and 200. The timing diagram 600 may be associated with communications between a UE and a base station, which may be examples of corresponding devices described with reference to FIGS. 1 and 2.

A UE may monitor search space occasions 605 within a period to detect and decode a broadcast channel transmission such as a PDCCH transmission. The period and the search space occasions 605 may be associated with a PDCCH search set and a CORESET. For a given PDCCH search set and CORESET, the UE may assume that a same PDCCH candidate is used to transmit a same DCI across all search space occasions 605 in the period.

As illustrated in FIG. 6, the UE may monitor narrowband search space occasions 610 in addition to monitoring the search space occasions 605. In some examples, the narrowband search space occasions 610 may include different or additional scrambling such that UEs with reduced bandwidth capabilities (e.g., the UE, which may be an NR-Light UE) may detect the narrowband search space occasions 610 while other UEs (e.g., UEs without reduced bandwidth capabilities) may be unable to detect the narrowband search space occasions 610. In some examples, the narrowband search space occasions 610 may overlap with the search space occasions 605. A bandwidth of the narrowband search space occasions 610 may be less than a bandwidth of the search space occasions 605, and in some examples may be based on a bandwidth capability of the UE. In such cases, the UE may monitor consecutive narrowband search space occasions 610, which may include a narrowband search space occasion 610-*a* up to a narrowband search space occasion 610-*n*. The UE may additionally avoid retuning between the narrowband search space occasions 610, which improve channel detection efficiency and power saving. In some examples, a mapping of resource elements in the narrowband search space occasions 610 may be different than a mapping of resource elements in the search space occasions 605.

The UE may monitor the search space occasions 605 according to a monitoring periodicity 620-*b*. That is, the monitoring periodicity 620-*b* may correspond to a duration between a beginning of two consecutive search space occasions 605, such as a search space occasion 605-*a* and a search space occasion 605-*b*. In addition, the UE may monitor the narrowband search space occasions 610 according to a monitoring periodicity 620-*a*.

The UE may monitor a number of the search space occasions 605 and/or the narrowband search space occasions 610 in the period to capture samples of the broadcast channel in order to detect and decode the broadcast channel. As such, these techniques may improve UE channel detection efficiencies, among other benefits.

Figure 7:
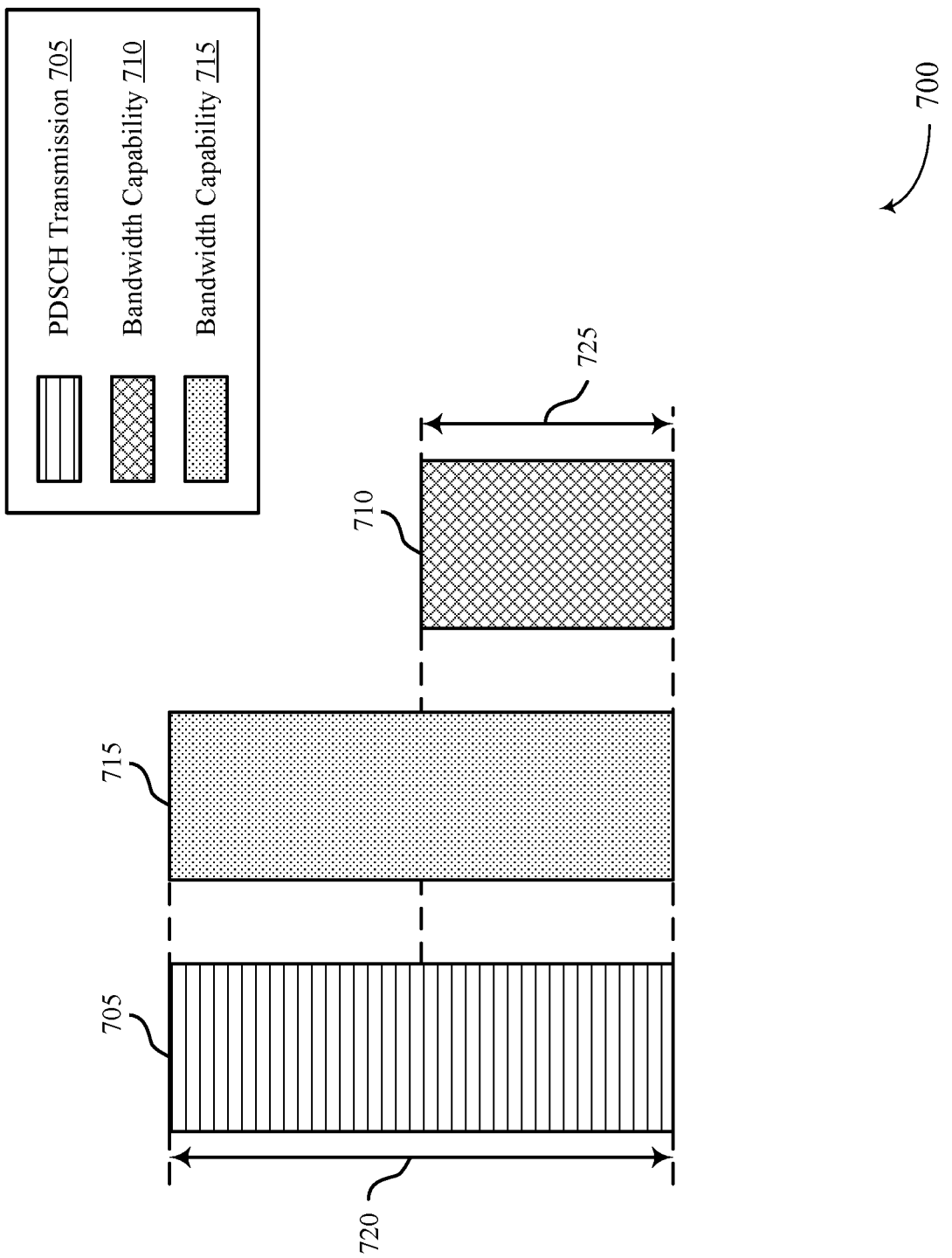
FIG. 7 illustrates an example of a channel detection process that supports managing broadcast channels based on bandwidth in accordance with aspects of the present disclosure.

FIG. 7 illustrates an example of a channel detection process 700 that supports managing broadcast channels based on bandwidth in accordance with aspects of the present disclosure. In some examples, channel detection process 700 may implement aspects of the wireless communication systems 100 and 200. The channel detection process 700 may be associated with a UE, which may be an example of corresponding devices described with reference to FIGS. 1 and 2. The channel detection process 700 may include features for improved UE operations, among other benefits.

According to the techniques described herein, a number of UEs may detect and decode a PDCCH transmission identifying a frequency domain resource allocation for transmission of a broadcast channel such as a PDSCH transmission 705. The frequency domain resource allocation may correspond to a bandwidth 720. Each UE may identify an associated bandwidth capability. For example, a first UE may have a bandwidth capability 710, meaning the first UE may be capable of monitoring a bandwidth 725 (which is less than the bandwidth 720) during a given PDSCH transmission 705. A second UE may have a bandwidth capability 715, meaning the second UE may be capable of monitoring the full bandwidth 720 during the PDSCH transmission 705. Thus, if a single PDSCH transmission 705 is transmitted, the first UE may fail to detect and decode the PDSCH transmission 705 while the second UE may succeed in detecting and decoding the PDSCH transmission 705.

A wireless communications system may support the coexistence of UEs with reduced bandwidth capabilities (e.g., the first UE, or NR-Light UEs) with other UEs (e.g., the second UE) by transmitting repetitions of the PDSCH transmission 705 in multiple transmission occasions. The first UE may retune between transmission occasions according to the bandwidth capability 710 in order to capture samples in subbands (e.g., corresponding to the bandwidth 725) in order to detect and decode the PDSCH transmission 705. The described techniques may support improvements in channel detection efficiencies for UEs with reduced bandwidth capabilities.

Figure 8:
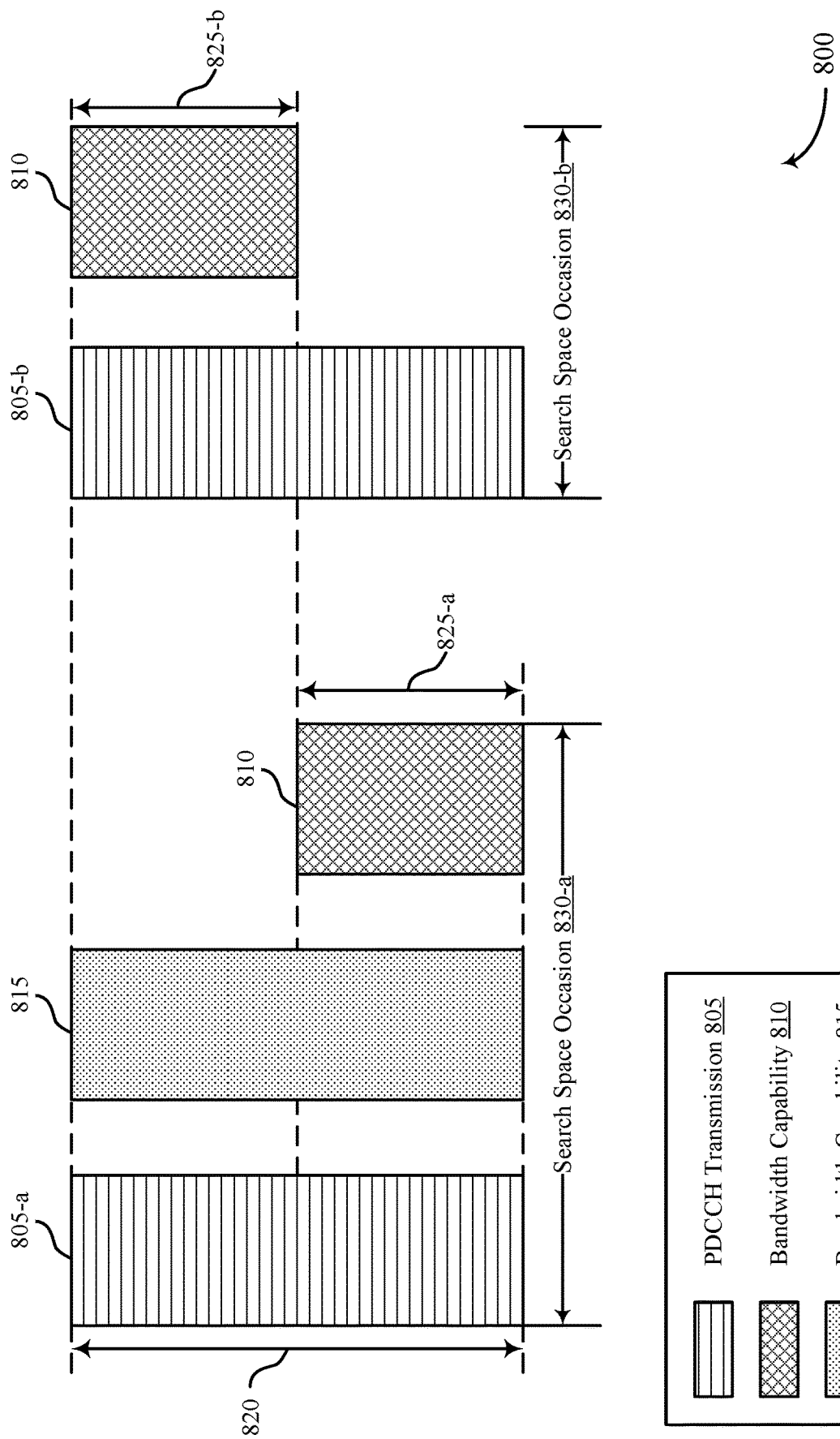
FIG. 8 illustrates an example of a channel detection process that supports managing broadcast channels based on bandwidth in accordance with aspects of the present disclosure.

FIG. 8 illustrates an example of a channel detection process 800 that supports managing broadcast channels based on bandwidth in accordance with aspects of the present disclosure. In some examples, channel detection process 800 may implement aspects of the wireless communication systems 100 and 200. The channel detection process 800 may be associated with a UE, which may be an example of corresponding devices described with reference to FIGS. 1 and 2. The channel detection process 800 may include features for improved UE operations, among other benefits.

According to the techniques described herein, a number of UEs may detect and decode a PDCCH transmission identifying a frequency domain resource allocation for transmission of a broadcast channel such as a PDSCH transmission 805. The frequency domain resource allocation may correspond to a bandwidth 820. Each UE may identify an associated bandwidth capability. For example, a first UE may have a bandwidth capability 810, meaning the first UE may be capable of monitoring a bandwidth 825 (which is less than the bandwidth 820) during a given PDSCH transmission 805. A second UE may have a bandwidth capability 815, meaning the second UE may be capable of monitoring the full bandwidth 820 during the PDSCH transmission 805. Thus, if a single PDSCH transmission 805 is transmitted, the first UE may fail to detect and decode the PDSCH transmission 805 while the second UE may succeed in detecting and decoding the PDSCH transmission 805.

A wireless communications system may support the coexistence of UEs with reduced bandwidth capabilities (e.g., the first UE, or NR-Light UEs) with other UEs (e.g., the second UE) by transmitting repetitions of the PDSCH transmission 805 in multiple transmission occasions 830. As illustrated in FIG. 8, in a first transmission occasion 830-a, the first UE may monitor a bandwidth 825-a corresponding to the bandwidth capability 810 to capture a first sample of the PDSCH transmission 805-a. Before a second transmission occasion 830-b, the first UE may retune components such that the first UE may monitor a bandwidth 825-b corresponding to the bandwidth capability 810. In some examples, the bandwidth 825-b may not overlap with the bandwidth 825-a. In the second transmission occasion 830-b, the first UE may monitor the bandwidth 825-b to capture a second sample of the PDSCH transmission 805-b.

The PDSCH transmission 805-b may be identical to the PDSCH transmission 805-a. For example, the first UE may assume that each transmission occasion 830 is transmitted in the same frequency domain resource allocation. The first UE may further assume a same transport block size, a same channel coding, and a same redundancy version is used for each PDSCH transmission 805 in each transmission occasion 830 of the period. In some examples, the redundancy version may cycle in subsequent repetitions of the PDSCH transmission 805. In such cases, the redundancy version cycling may be configured for the first UE.

In subsequent transmission occasions 830 of the period, the first UE may capture additional samples in additional bandwidths 825. When the first UE has captured a number of samples, the UE may detect the broadcast PDSCH transmission 805. The first UE may then decode and process the broadcast PDSCH transmission 805. Based on the assumption that each PDSCH transmission 805 is identical, the first UE may descramble a log-likelihood ratio for the PDSCH transmission 805 in addition to decoding the PDSCH transmission 805.

Figure 9:
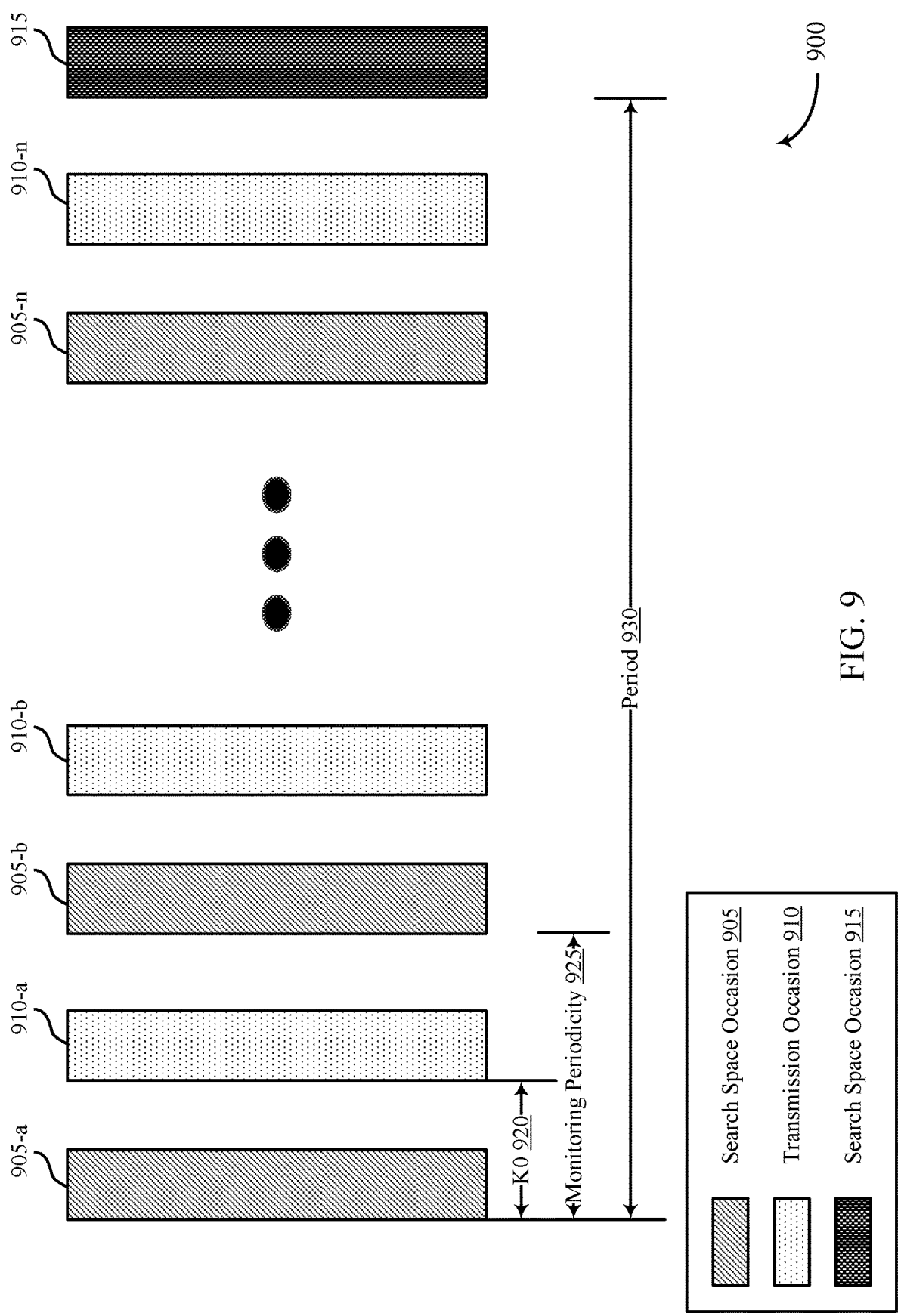
FIG. 9 illustrates an example of a timing diagram that supports managing broadcast channels based on bandwidth in accordance with aspects of the present disclosure.

FIG. 9 illustrates an example of a timing diagram 900 that supports managing broadcast channels based on bandwidth in accordance with aspects of the present disclosure. In some examples, timing diagram 900 may implement aspects of the wireless communication systems 100 and 200. The timing diagram 900 may be associated with communications between a UE and a base station, which may be examples of corresponding devices described with reference to FIGS. 1 and 2.

A UE may monitor search space occasions 905 within a period 930 to detect and decode a broadcast channel transmission such as a PDCCH transmission. The period 930 and the search space occasions 905 may be associated with a PDCCH search set and a CORESET. For a given PDCCH search set and CORESET, the UE may assume that a same PDCCH candidate is used to transmit a same DCI across all search space occasions 905 in the period 930. Additional search space occasions outside the period 930, such as a search space occasion 915, may be configured to the UE separately, for example by separate signaling.

The UE may monitor the search space occasions 905 according to a monitoring periodicity 925. That is, the monitoring periodicity 925 may correspond to a duration between a beginning of two consecutive search space occasions 905, such as a search space occasion 905-a and a search space occasion 905-b. The period 930 may include a quantity of repetitions of the search space occasion 905, which may include the search space occasion 905-a, the search space occasion 905-b, up to a search space occasion 905-n.

The UE may determine the period 930 (e.g., a duration of the period 930, time and frequency resources for in which the period 930 is received) in which to monitor the search space occasion 905 based on one or more parameters. For example, the period 930 may correspond to or be a function of a system information modification period, a DRX cycle (e.g., for paging), or a configuration and/or configuration association period for a RACH procedure. In some cases, the period 930 may be based on a determined quantity of search space occasions 905 in the period 930. In some examples, the period may be a function of the downlink bandwidth configured for transmission of the broadcast channel. In some examples, the period 930 may be explicitly signaled to the UE by a base station, for example in system information.

The UE may monitor a number of the search space occasions 905 in the period 930 to capture samples of the broadcast PDCCH in order to detect and decode the PDCCH. Based on decoding the PDCCH, the UE may identify a frequency domain resource allocation for a broadcast PDSCH transmission. The UE may also identify a timing parameter 920 (e.g., a K0 parameter) which defines a duration between transmission of the PDCCH in a search space occasion 905 (e.g., the search space occasion 905-a) and a subsequent transmission of the PDSCH in a transmission occasion 910 (e.g., the transmission occasion 910-a).

The UE may monitor transmission occasions 910 in the period 930 based on the frequency domain resource allocation and the timing parameter 920 to detect and decode the broadcast PDSCH, for example by capturing samples of the PDSCH in consecutive transmission occasions 910, which may include a transmission occasion 910-a, a transmission occasion 910-b, up to a transmission occasion 910-n. The UE may assume that over the period 930, a number of parameters are the same for each transmission occasion 910. For example, the UE may assume that each transmission occasion 910 is transmitted in the same frequency domain resource allocation, and the same transport block size, channel coding, and redundancy version are used for the PDSCH in each transmission occasion 910 of the period 930. Based on this assumption, the UE may descramble a log-likelihood ratio for the PDSCH in addition to decoding the PDSCH.

Figure 10:
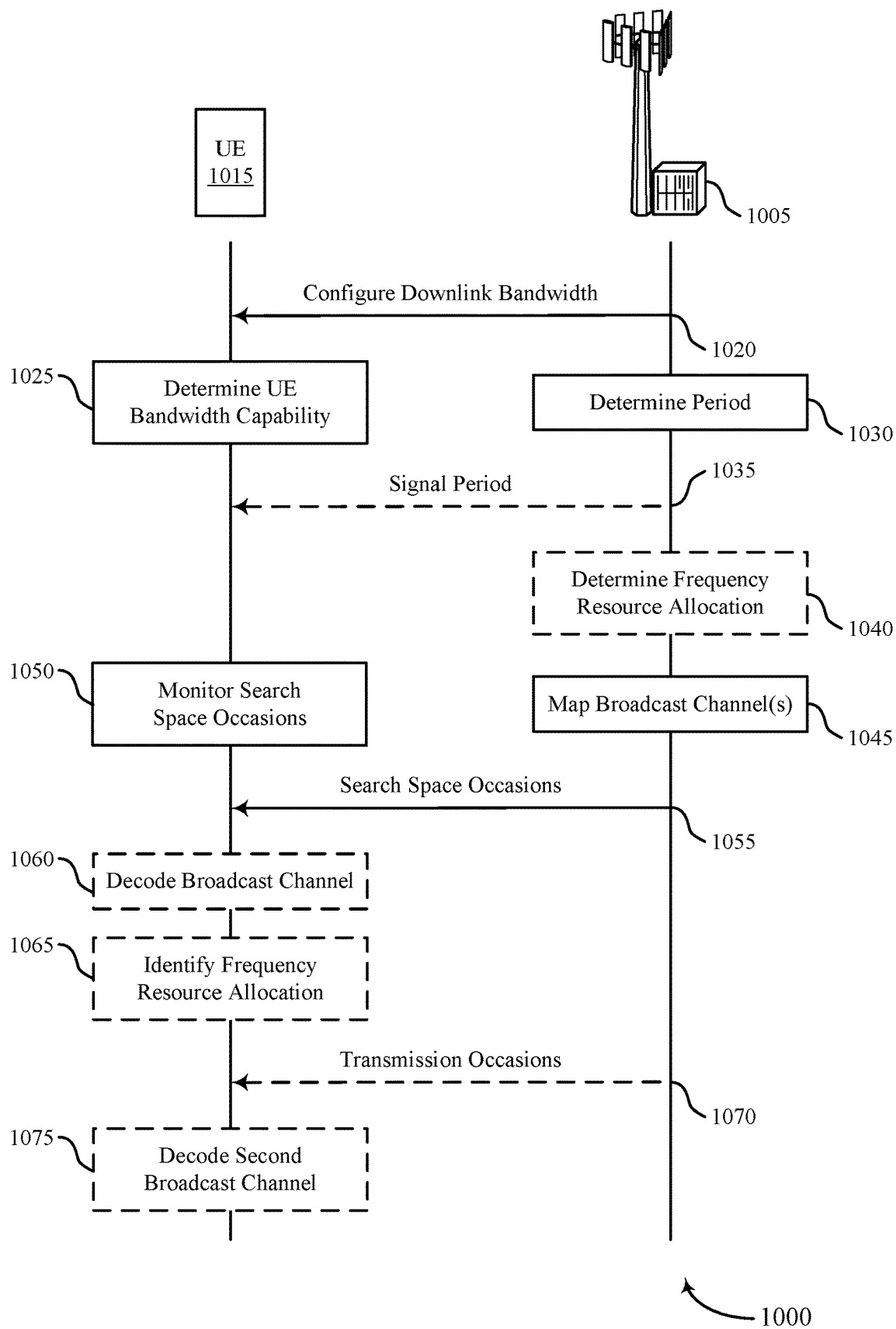
FIG. 10 illustrates an example of a process flow that supports managing broadcast channels based on bandwidth in accordance with aspects of the present disclosure.

FIG. 10 illustrates an example of a process flow 1000 that supports managing broadcast channels based on bandwidth in accordance with aspects of the present disclosure. In some examples, process flow 1000 may implement aspects of the wireless communication systems 100 and 200. For example, the process flow 1000 may include a base station 1005 and a UE 1015, which may be examples of the corresponding devices described with reference to FIGS. 1 and 2. In the following description of the process flow 1000, the operations between the base station 1005 and the UE 1015 may be transmitted in a different order than the example order shown, or the operations performed by the base station 1005 and the UE 1015 may be performed in different orders or at different times. Some operations may also be omitted from the process flow 1000, and other operations may be added to the process flow 1000. The operations performed by the base station 1005 and the UE 1015 may support improvement to the UE 1015 channel detection operations and, in some examples, may promote improvements to the UE 1015 reliability, among other benefits.

At 1020, the base station 1005 may transmit a signal to the UE 1015 configuring a downlink bandwidth for a broadcast channel transmission such as a PDCCH transmission. In some examples, the base station 1005 may transmit the signal in a MIB or a SIB.

At 1025, the UE 1015 may determine a bandwidth capability of the UE 1015. The UE 1015 may have a reduced bandwidth capability (e.g., the UE 1015 may be an NR-Light UE) that is less than the downlink bandwidth configured for the broadcast PDCCH transmission.

At 1030, the base station 1005 may determine a period in which to transmit repetitions of the broadcast channel in search space occasions. The period and the search space occasions may be associated with a CORESET and a search space set. The base station 1005 may determine the period (e.g., a duration of the period, time and frequency resources in which to transmit the period) in which to transmit the search space occasion based on one or more parameters. For example, the period may correspond to or be a function of a system information modification period, a DRX cycle (e.g., for paging), or a configuration and/or configuration association period for a RACH procedure. In some cases, the period may be determined based on a determined quantity of search space occasions in the period. In some examples, the period may be a function of the downlink bandwidth configured for transmission of the broadcast channel. In some examples, the base station 1005 may explicitly signal the period to the UE 1015 at 1035.

In some examples, at 1040 the base station 1005 may determine a frequency domain resource allocation for one or more broadcast PDSCH transmissions. The base station 1005 may determine to include an indication of the frequency domain resource allocation in the broadcast PDCCH transmission. The base station 1005 may also determine a timing parameter (e.g., a K0 parameter) indicating a duration between a PDCCH transmission in a search space occasion and a PDSCH transmission in a transmission occasion.

At 1045, the base station 1005 may map candidates of the PDCCH transmission to resource elements of the search space occasions. In some examples, the base station 1005 may use the same PDCCH candidate to transmit the same DCI in each search space occasion in the period. In some examples, the base station 1005 may map the PDSCH transmission to resource elements of transmission occasions in the period. The base station 1005 may map the PDSCH transmissions such that each transmission occasion is transmitted in the same frequency domain resource allocation, and a same transport block size, channel coding, and redundancy version are used for the PDSCH transmission in each transmission occasion of the period.

At 1050, the UE 1015 may determine to monitor one or more search space occasions in the period to detect the broadcast PDCCH. At 1055, the base station 1005 may transmit the search space occasions in the period. The UE 1015 may receive samples of the broadcast PDCCH in consecutive search space occasions to detect the broadcast PDCCH. In some examples, the UE 1015 may receive a first sample in a first subband in a first search space occasion, then retune to receive a second sample in a second subband in a second search space occasion. In some examples, the first and the second sample may not overlap. The UE 1015 may receive additional samples in additional subbands in additional search space occasions. The UE 1015 may detect the broadcast PDCCH based on the received samples, for example by combining the samples.

In some examples, the base station 1005 may transmit additional search space occasions to the UE 1015, which may be narrowband search space occasions. In some examples, the narrowband search space occasions may overlap with other search space occasions. A bandwidth of the narrowband search space occasions may be less than the configured downlink bandwidth of the PDCCH, and in some examples may be based on the bandwidth capability of the UE 1015. In such cases, the UE 1015 may avoid retuning between search space occasions to monitor non-overlapping subbands. In some examples, a mapping of resource elements in the narrowband search space occasions may be different from a mapping of resource elements in other search space occasions.

In some examples, at 1060 the UE 1015 may decode the PDCCH transmission based on detecting the PDCCH transmission. At 1065, the UE 1015 may in some examples identify the frequency resource domain allocation for transmission of a second broadcast channel such as the broadcast PDSCH. The UE 1015 may also identify the timing parameter indicating the duration between a PDCCH transmission in a search space occasion and a PDSCH transmission in a transmission occasion. The UE 1015 may determine to monitor transmission occasions based on the frequency domain resource allocation and the timing parameter to detect the broadcast PDSCH transmission.

In some examples, at 1070, the base station 1005 may transmit the broadcast PDSCH in transmission occasions in the period. The UE 1015 may receive samples of the broadcast PDSCH in consecutive transmission occasions. The UE 1015 may assume that over the period, a number of parameters of the transmission occasions may be the same, such as the transport block size, the channel coding, and the redundancy version. Based on these assumptions and on receiving the samples, at 1075 the UE 1015 may decode the broadcast PDSCH transmission, for example by combining the samples of the broadcast PDSCH transmission. In some examples, the UE 1015 may descramble a log-likelihood ratio for the PDSCH in addition to decoding the PDSCH.

The operations performed by the base station 1005 and the UE 1015 may therefore support improvements to the UE 1015 channel detection operations and in some examples, may promote improvements to the UE 1015 reliability, among other benefits.

Figure 11:
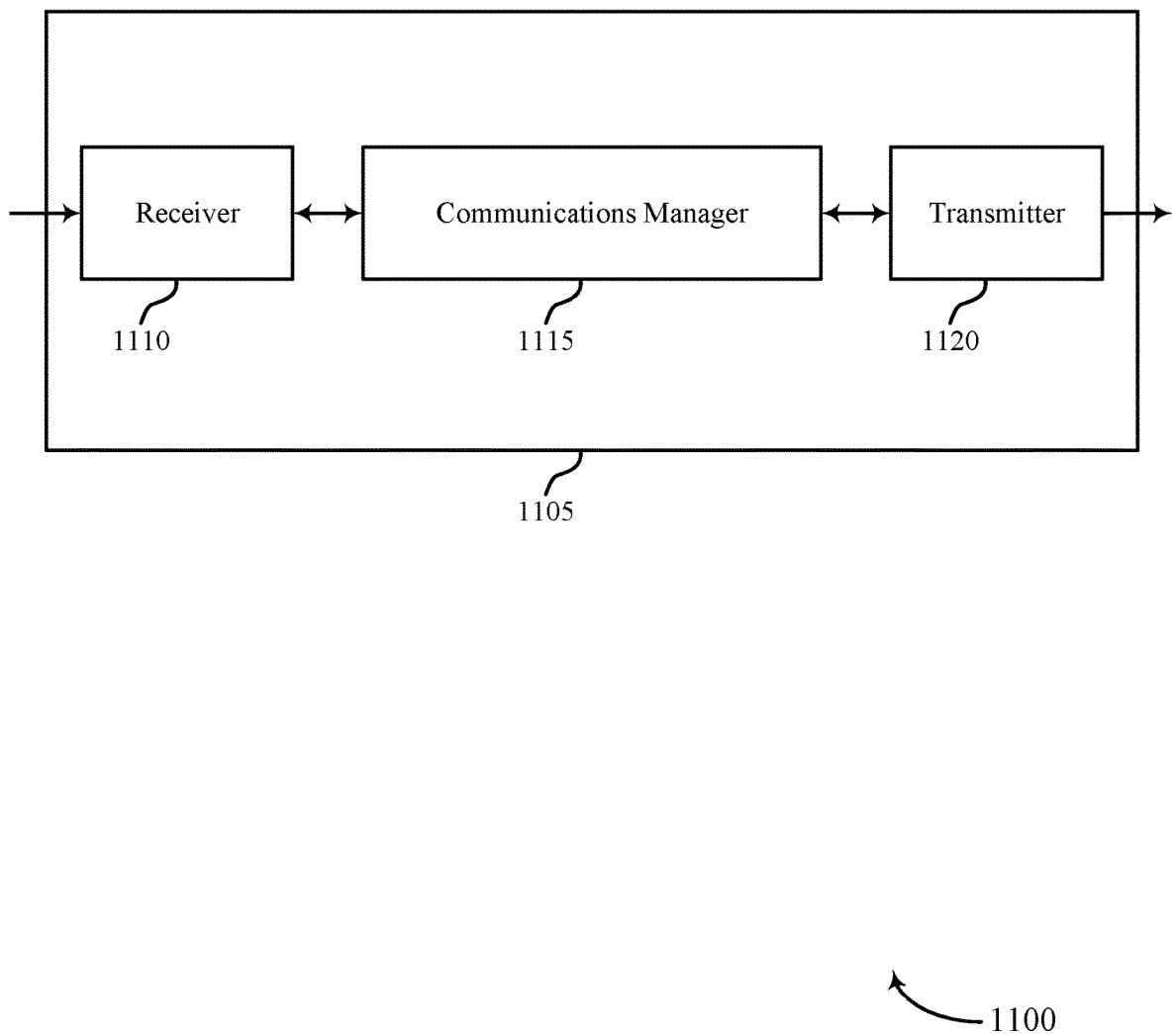
FIGS. 11 and 12 show block diagrams of devices that support managing broadcast channels based on bandwidth in accordance with aspects of the present disclosure.

FIG. 11 shows a block diagram 1100 of a device 1105 that supports managing broadcast channels based on bandwidth in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to managing broadcast channels based on bandwidth, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive a signal configuring a downlink bandwidth of a broadcast channel, determine a bandwidth capability of the UE is less than the downlink bandwidth of the broadcast channel, receive one or more samples of the broadcast channel in the search space occasions, monitor one or more search space occasions in a period based on the bandwidth capability, and detect the broadcast channel based on the samples.

The communications manager 1115 may be implemented as an integrated circuit or chipset for the device 1105 processor, and the receiver 1110 and the transmitter 1120 may be implemented as analog components (for example, amplifiers, filters, antennas) coupled with the device 1105 processor to enable wireless transmission and reception. The communications manager 1115 as described herein may be implemented to realize one or more potential advantages. One implementation may allow the device 1105 to save power and increase battery life by communicating with a base station 105 (as shown in FIG. 1) more efficiently. For example, the device 1105 may efficiently obtain information transmitted by a base station 105 in a broadcast channel, as the device 1105 may be able to reconfigure channel detection processes and monitor multiple search space occasion in a period to successfully detect the broadcast channel. Another implementation may promote low latency communications at the device 1105, as a number of resources allocated to channel detection may be reduced. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
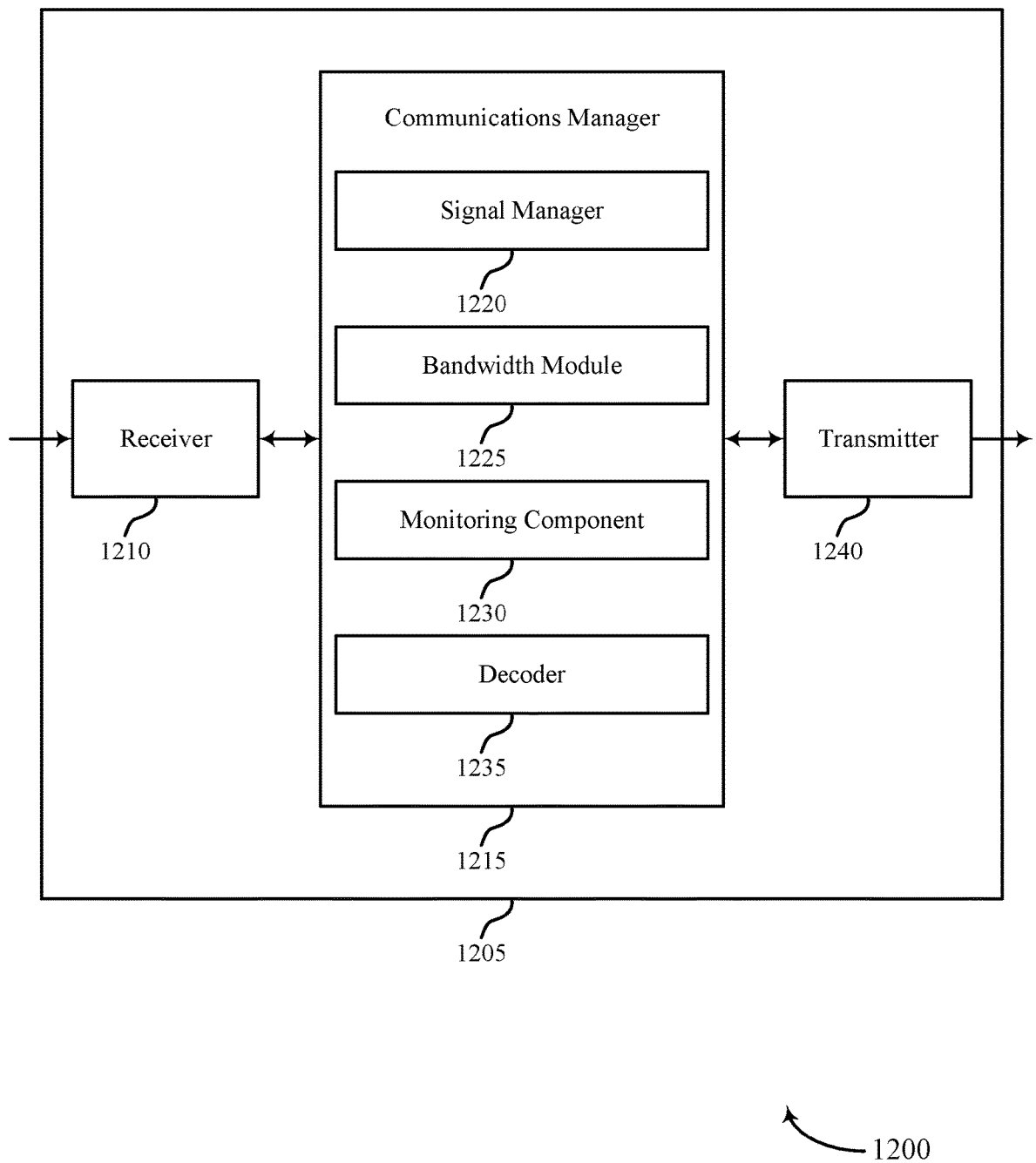

FIG. 12 shows a block diagram 1200 of a device 1205 that supports managing broadcast channels based on bandwidth in accordance with aspects of the present disclosure. The device 1205 may be an example of aspects of a device 1105, or a UE 115 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to managing broadcast channels based on bandwidth, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a signal manager 1220, a bandwidth module 1225, a monitoring component 1230, and a decoder 1235. The communications manager 1215 may be an example of aspects of the communications manager 1410 described herein.

The signal manager 1220 may receive a signal configuring a downlink bandwidth of a broadcast channel. The bandwidth module 1225 may determine a bandwidth capability of the UE is less than the downlink bandwidth of the broadcast channel and receive one or more samples of the broadcast channel in the search space occasions. The monitoring component 1230 may monitor one or more search space occasions in a period based on the bandwidth capability. The decoder 1235 may detect the broadcast channel based on the samples.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
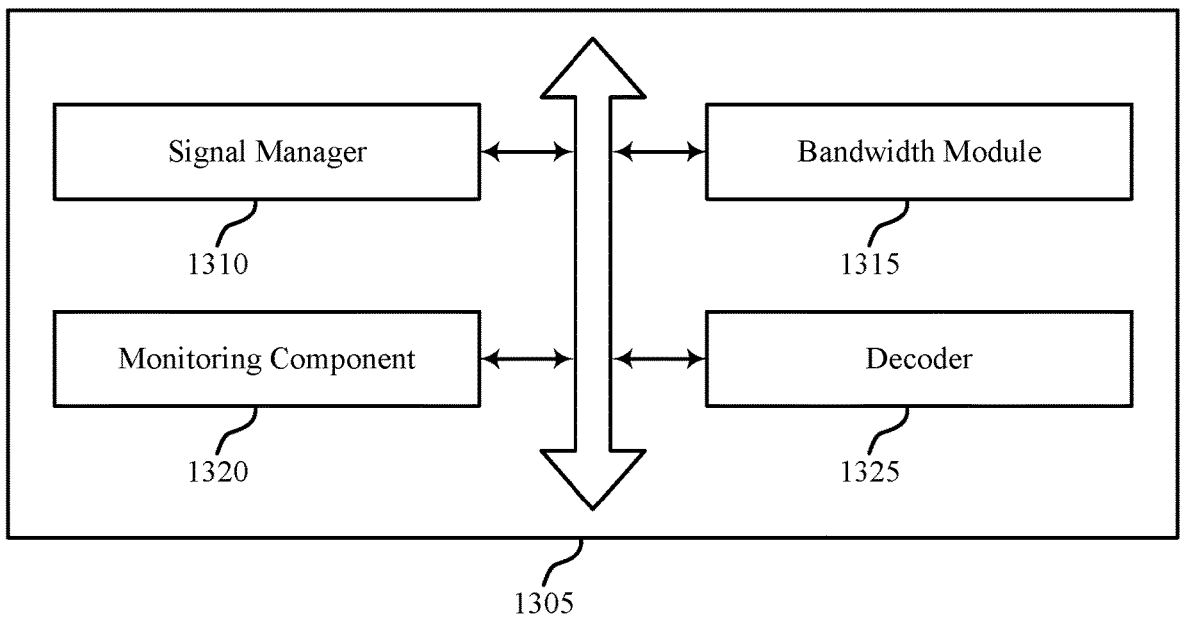
FIG. 13 shows a block diagram of a communications manager that supports managing broadcast channels based on bandwidth in accordance with aspects of the present disclosure.

FIG. 13 shows a block diagram 1300 of a communications manager 1305 that supports managing broadcast channels based on bandwidth in accordance with aspects of the present disclosure. The communications manager 1305 may be an example of aspects of a communications manager 1115, a communications manager 1215, or a communications manager 1410 described herein. The communications manager 1305 may include a signal manager 1310, a bandwidth module 1315, a monitoring component 1320, and a decoder 1325. Each of these modules may communicate, directly or indirectly, with one another (e.g., via one or more buses).

The signal manager 1310 may receive a signal configuring a downlink bandwidth of a broadcast channel. In some examples, the signal manager 1310 may receive a second signal identifying one or more parameters of the period, or the search space occasions, or a combination thereof. In some cases, the signal includes a MIB or a SIB.

The bandwidth module 1315 may determine a bandwidth capability of the UE is less than the downlink bandwidth of the broadcast channel. In some examples, the bandwidth module 1315 may receive one or more samples of the broadcast channel in the search space occasions. In some examples, the bandwidth module 1315 may receive a first sample in a first subband of the downlink bandwidth in a first search space occasion. In some examples, the bandwidth module 1315 may receive a second sample in a second subband of the downlink bandwidth in a second search space occasion, where the first subband fails to overlap the second subband. In some examples, the bandwidth module 1315 may receive one or more samples of the second broadcast channel in the transmission occasions in the period. In some examples, the bandwidth module 1315 may receive a first sample in a first subband of the frequency resources in a first transmission occasion. In some examples, the bandwidth module 1315 may receive a second sample in a second subband of the frequency resources in a second transmission occasion, where the first subband may fail to overlap the second subband. In some examples, the bandwidth module 1315 may receive the samples of the second broadcast channel based on an assumption that consecutive transmission occasions in the period are transmitted in the same frequency domain resource allocation for the second broadcast channel.

The monitoring component 1320 may monitor one or more search space occasions in a period based on the bandwidth capability. In some examples, the monitoring component 1320 may monitor one or more transmission occasions in the period on frequency resources of the frequency domain resource allocation. In some examples, the monitoring component 1320 may identify one or more parameters associated with the transmission occasions. In some examples, the monitoring component 1320 may identify a duration between transmitting a first search space occasion and a first transmission occasion based on decoding the broadcast channel. In some cases, the parameters include a transport block size, a channel coding, a redundancy version, or a combination thereof. In some cases, the search space occasions are associated with a CORESET, a search space set, or a combination thereof. In some cases, the period is based on a quantity of the search space occasions, a system information modification period, a discontinuous reception cycle for paging, the downlink bandwidth, a RACH configuration period, a RACH configuration association period, or a combination thereof.

The decoder 1325 may detect the broadcast channel based on the samples. In some examples, the decoder 1325 may detect the broadcast channel based on an assumption that a same channel candidate is used to transmit a same downlink control information over consecutive search space occasions in the period associated with a search space set and a control resource set. In some examples, the decoder 1325 may decode the broadcast channel based on the detecting. In some examples, the decoder 1325 may identify a frequency domain resource allocation for a second broadcast channel based on decoding the broadcast channel. In some examples, the decoder 1325 may decode the second broadcast channel based on the samples of the second broadcast channel. In some examples, the decoder 1325 may descramble a log-likelihood ratio associated with the second broadcast channel based on the parameters. In some examples, the decoder 1325 may decode the second broadcast channel based on an assumption that the second broadcast channel is repeatedly transmitted over consecutive transmission occasions in the period. In some examples, the decoder 1325 may detect the broadcast channel based on channel candidates associated with the CORESET, the search space set, or a combination thereof.

In some cases, the second broadcast channel includes a broadcast PDSCH. In some cases, a first search space occasion has a first resource element mapping based on the downlink bandwidth. In some cases, a second search space occasion has a second resource element mapping based on the bandwidth capability of the UE. In some cases, the broadcast channel includes a broadcast PDCCH. In some cases, the broadcast channel indicates system information, paging information, one or more messages in a RACH procedure, or a combination thereof.

Figure 14:
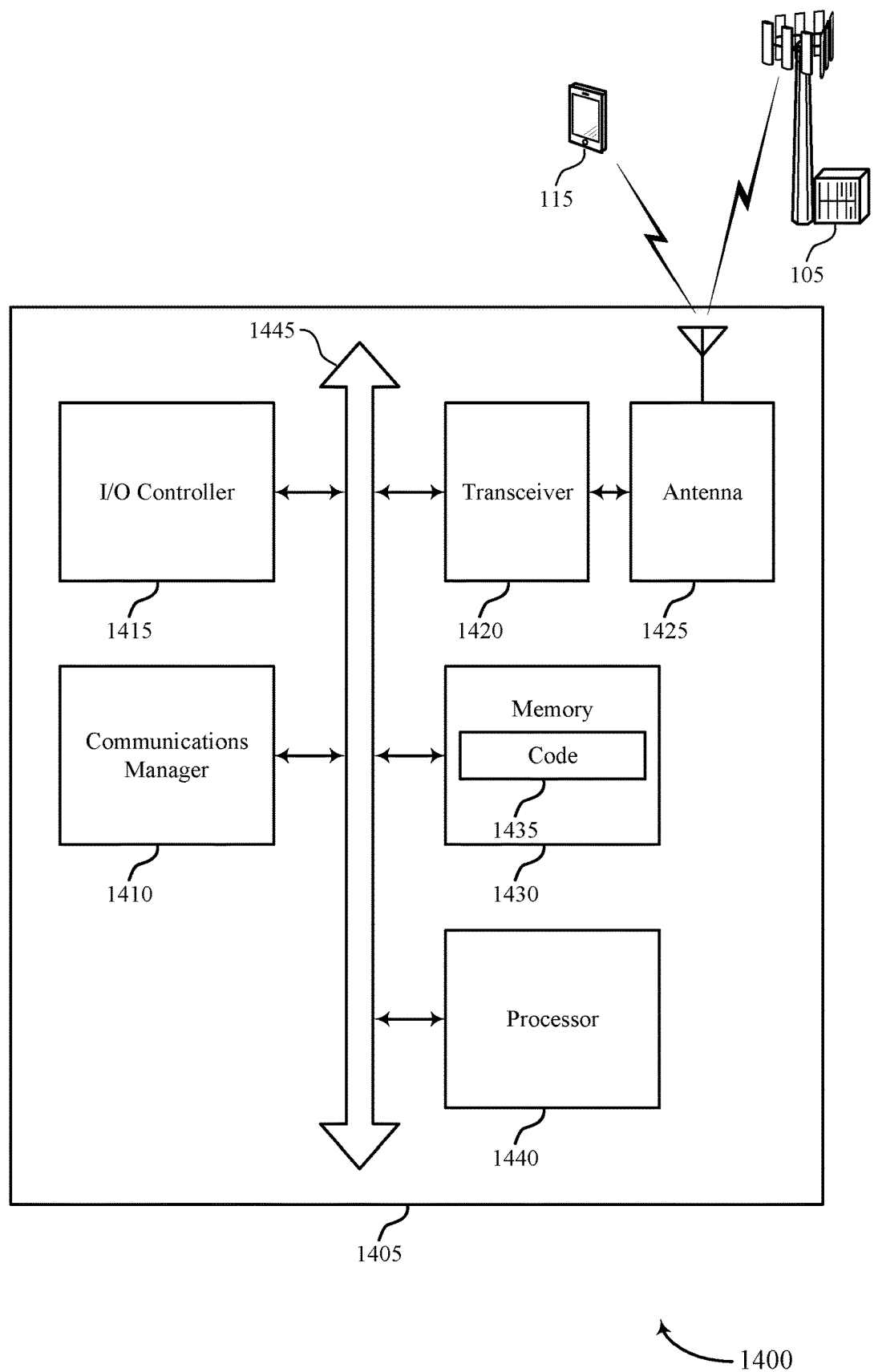
FIG. 14 shows a diagram of a system including a device that supports managing broadcast channels based on bandwidth in accordance with aspects of the present disclosure.

FIG. 14 shows a diagram of a system 1400 including a device 1405 that supports managing broadcast channels based on bandwidth in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may receive a signal configuring a downlink bandwidth of a broadcast channel, determine a bandwidth capability of the UE is less than the downlink bandwidth of the broadcast channel, receive one or more samples of the broadcast channel in the search space occasions, monitor one or more search space occasions in a period based on the bandwidth capability, and detect the broadcast channel based on the samples. At least one implementation may enable the communications manager 1410 to detect broadcast channels when a bandwidth capability of the UE is less than the downlink bandwidth of the broadcast channels. Based on implementing the detecting, one or more processors of the device 1405 (for example, the processor 1440 or processor(s) controlling or incorporated with the communications manager 1410) may experience reduced power consumption and promote low latency communications, among other benefits.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include random-access memory (RAM) and read-only memory (ROM). The memory 1430 may store computer-readable, computer-executable code 1435 including instructions that, when executed, cause the processor to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting managing broadcast channels based on bandwidth).

The processor 1440 of the device 1405 (e.g., controlling the receiver 1110, the transmitter 1120, or the transceiver 1420) may reduce power consumption and increase channel detection reliability based on receiving samples of the broadcast channel according to a bandwidth capability. In some examples, the processor 1440 of the device 1405 may reconfigure channel detection parameters for detection of a broadcast channel. For example, the processor 1440 of the device 1405 may turn on one or more processing units for performing a channel detection, increase a processing clock, or a similar mechanism within the device 1405. As such, when subsequent transmissions of broadcast channels are received in subsequent search space occasions or periods, the processor 1440 may be ready to respond more efficiently through the reduction of a ramp up in processing power. The improvements in power saving and channel detection reliability may further increase battery life at the device 1405 (for example, by reducing or eliminating unnecessary or failed channel detection processes, etc.).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
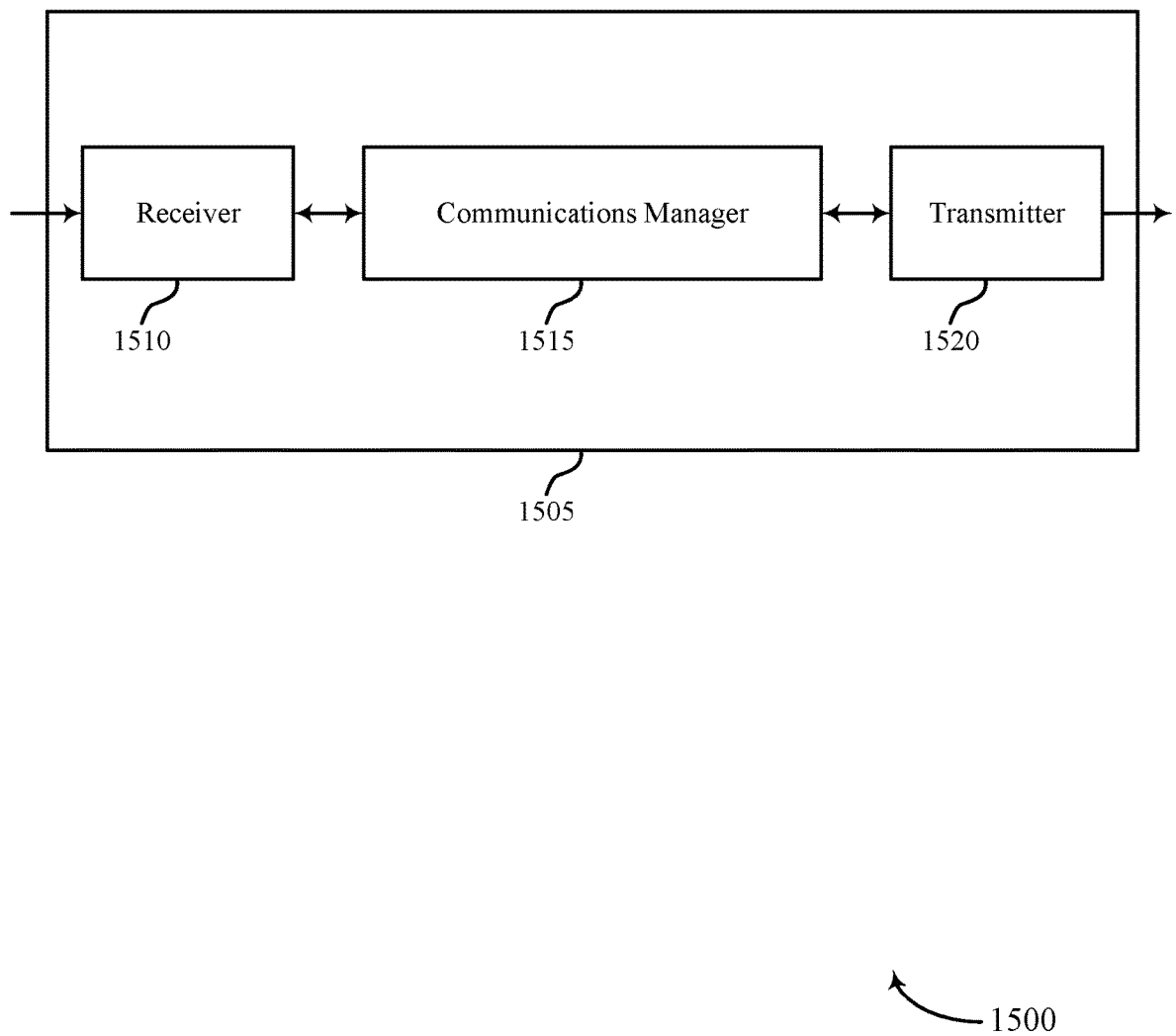
FIGS. 15 and 16 show block diagrams of devices that support managing broadcast channels based on bandwidth in accordance with aspects of the present disclosure.

FIG. 15 shows a block diagram 1500 of a device 1505 that supports managing broadcast channels based on bandwidth in accordance with aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to managing broadcast channels based on bandwidth, etc.). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may transmit a signal configuring a downlink bandwidth of a broadcast channel to a UE, determine a period including one or more search space occasions for transmission of the broadcast channel, map the broadcast channel to resource elements in each search space occasion in the period, and transmit the broadcast channel in each search space occasion in the period based on the mapping.

The communications manager 1515 as described herein may be implemented to realize one or more potential advantages. One implementation may allow the device 1505 to save power by communicating with a UE 115 (as shown in FIG. 1) more efficiently. For example, the device 1505 may efficiently transmit information to a UE 115 in a broadcast channel, as the device 1505 may be able to reconfigure broadcast channel transmission processes and transmit multiple search space occasion in a period to increase the likelihood of the UE 115 successfully detecting the broadcast channel. The communications manager 1515 may be an example of aspects of the communications manager 1810 described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
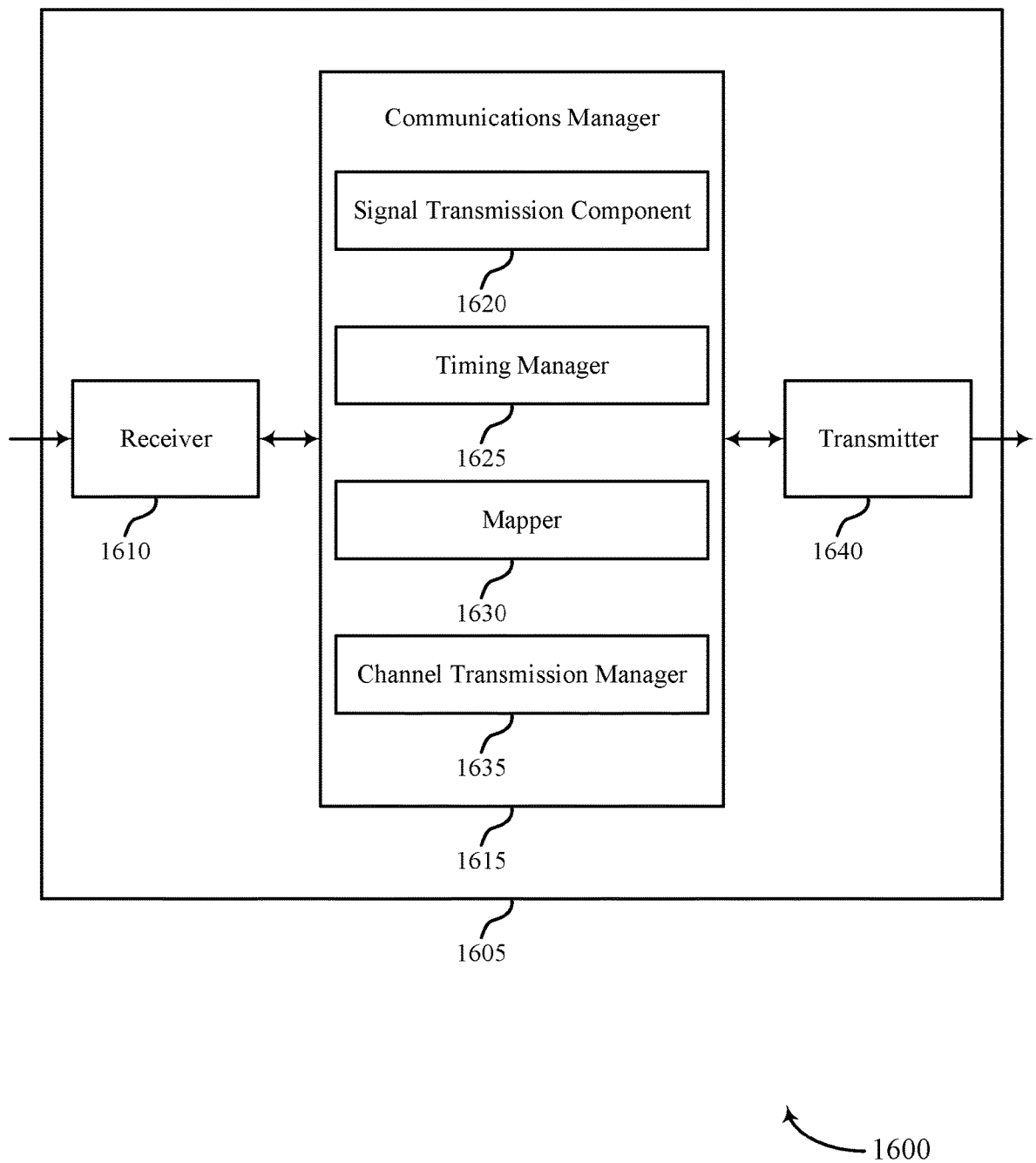

FIG. 16 shows a block diagram 1600 of a device 1605 that supports managing broadcast channels based on bandwidth in accordance with aspects of the present disclosure. The device 1605 may be an example of aspects of a device 1505, or a base station 105 as described herein. The device 1605 may include a receiver 1610, a communications manager 1615, and a transmitter 1640. The device 1605 may also include a processor. Each of these components may be in communication with one another (e.g., via one or more buses).

The receiver 1610 may receive information such as packets, user data, or control information associated with various information channels (e.g., control channels, data channels, and information related to managing broadcast channels based on bandwidth, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a signal transmission component 1620, a timing manager 1625, a mapper 1630, and a channel transmission manager 1635. The communications manager 1615 may be an example of aspects of the communications manager 1810 described herein.

The signal transmission component 1620 may transmit a signal configuring a downlink bandwidth of a broadcast channel to a UE. The timing manager 1625 may determine a period including one or more search space occasions for transmission of the broadcast channel. The mapper 1630 may map the broadcast channel to resource elements in each search space occasion in the period. The channel transmission manager 1635 may transmit the broadcast channel in each search space occasion in the period based on the mapping.

The transmitter 1640 may transmit signals generated by other components of the device 1605. In some examples, the transmitter 1640 may be collocated with a receiver 1610 in a transceiver module. For example, the transmitter 1640 may be an example of aspects of the transceiver 1820 described with reference to FIG. 18. The transmitter 1640 may utilize a single antenna or a set of antennas.

Figure 17:
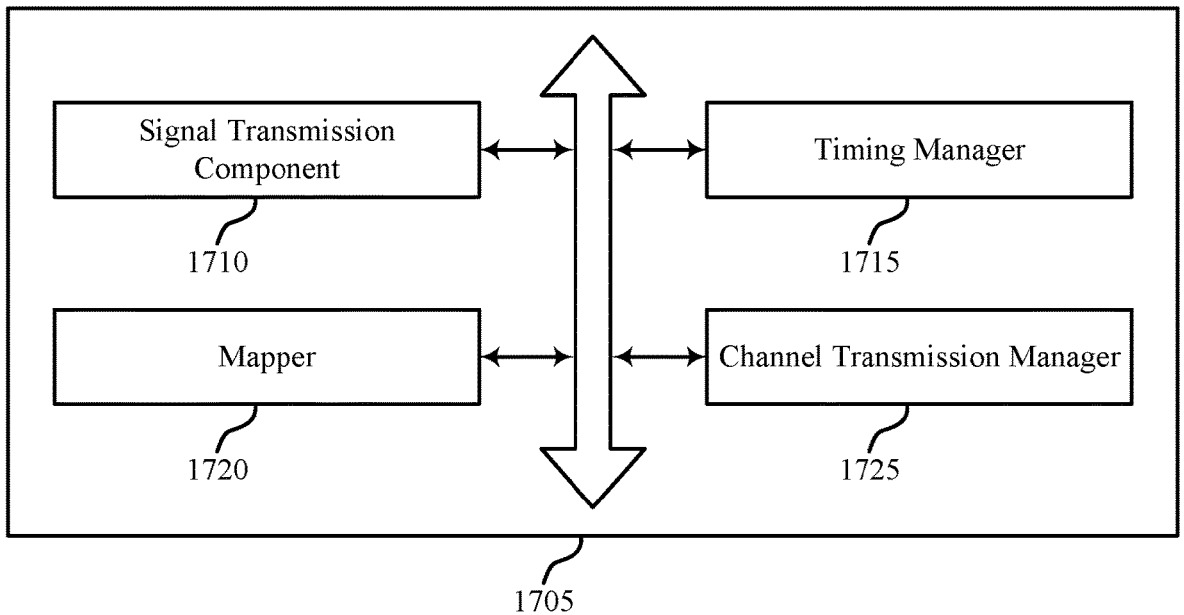
FIG. 17 shows a block diagram of a communications manager that supports managing broadcast channels based on bandwidth in accordance with aspects of the present disclosure.

FIG. 17 shows a block diagram 1700 of a communications manager 1705 that supports managing broadcast channels based on bandwidth in accordance with aspects of the present disclosure. The communications manager 1705 may be an example of aspects of a communications manager 1515, a communications manager 1615, or a communications manager 1810 described herein. The communications manager 1705 may include a signal transmission component 1710, a timing manager 1715, a mapper 1720, and a channel transmission manager 1725. Each of these modules may communicate, directly or indirectly, with one another (e.g., via one or more buses).

The signal transmission component 1710 may transmit a signal configuring a downlink bandwidth of a broadcast channel to a UE. In some examples, the signal transmission component 1710 may transmit a second signal identifying one or more parameters of the period, or the search space occasions, or a combination thereof, to the UE. In some cases, the signal includes a MIB or a SIB.

The timing manager 1715 may determine a period including one or more search space occasions for transmission of the broadcast channel. In some examples, the timing manager 1715 may determine a duration between transmitting a first search space occasion and a first transmission occasion. In some cases, the period is determined based on a quantity of the search space occasions, a system information modification period, a discontinuous reception cycle for paging, the downlink bandwidth, a RACH configuration period, a RACH configuration association period, or a combination thereof.

The mapper 1720 may map the broadcast channel to resource elements in each search space occasion in the period. In some examples, the mapper 1720 may map downlink control information of the broadcast channel to a same channel candidate of the broadcast channel in each search space occasion in the period. In some examples, the mapper 1720 may determine one or more parameters associated with the transmission occasions. In some examples, the mapper 1720 may map the broadcast channel to resource elements in a first search space occasion based on the downlink bandwidth. In some examples, the mapper 1720 may map the broadcast channel to resource elements in a second search space occasion based on a bandwidth capability of the UE.

In some cases, the parameters include a transport block size, a channel coding, a redundancy version, or a combination thereof. In some cases, the search space occasions are associated with a CORESET, a search space set, or a combination thereof. In some cases, the broadcast channel indicates system information, paging information, one or more messages in a RACH procedure, or a combination thereof.

The channel transmission manager 1725 may transmit the broadcast channel in each search space occasion in the period based on the mapping. In some examples, the channel transmission manager 1725 may transmit, in the broadcast channel, a frequency domain resource allocation for a second broadcast channel. In some examples, the channel transmission manager 1725 may transmit the second broadcast channel in one or more transmission occasions in the period on frequency resources of the frequency domain resource allocation. In some examples, the channel transmission manager 1725 may transmit consecutive transmission occasions in the period in the same frequency domain resource allocation. In some examples, the channel transmission manager 1725 may transmit repetitions of the second broadcast channel in consecutive transmission occasions in the period. In some cases, the second broadcast channel includes a broadcast PDSCH. In some cases, the broadcast channel includes a broadcast PDCCH.

Figure 18:
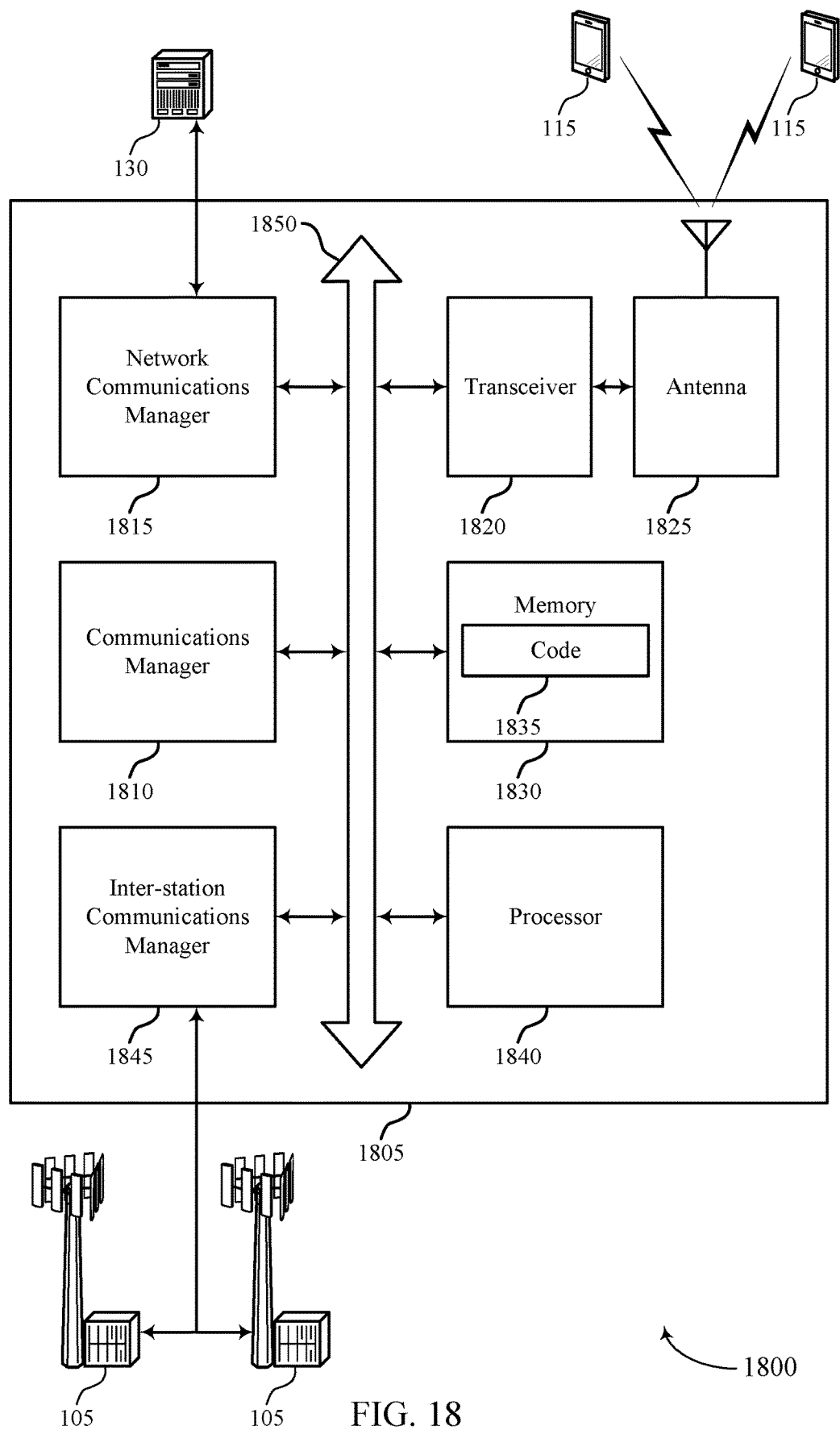
FIG. 18 shows a diagram of a system including a device that supports managing broadcast channels based on bandwidth in accordance with aspects of the present disclosure.

FIG. 18 shows a diagram of a system 1800 including a device 1805 that supports managing broadcast channels based on bandwidth in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The communications manager 1810 may transmit a signal configuring a downlink bandwidth of a broadcast channel to a UE, determine a period including one or more search space occasions for transmission of the broadcast channel, map the broadcast channel to resource elements in each search space occasion in the period, and transmit the broadcast channel in each search space occasion in the period based on the mapping.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting managing broadcast channels based on bandwidth).

The inter-station communications manager 1845 may manage communications with other base station 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
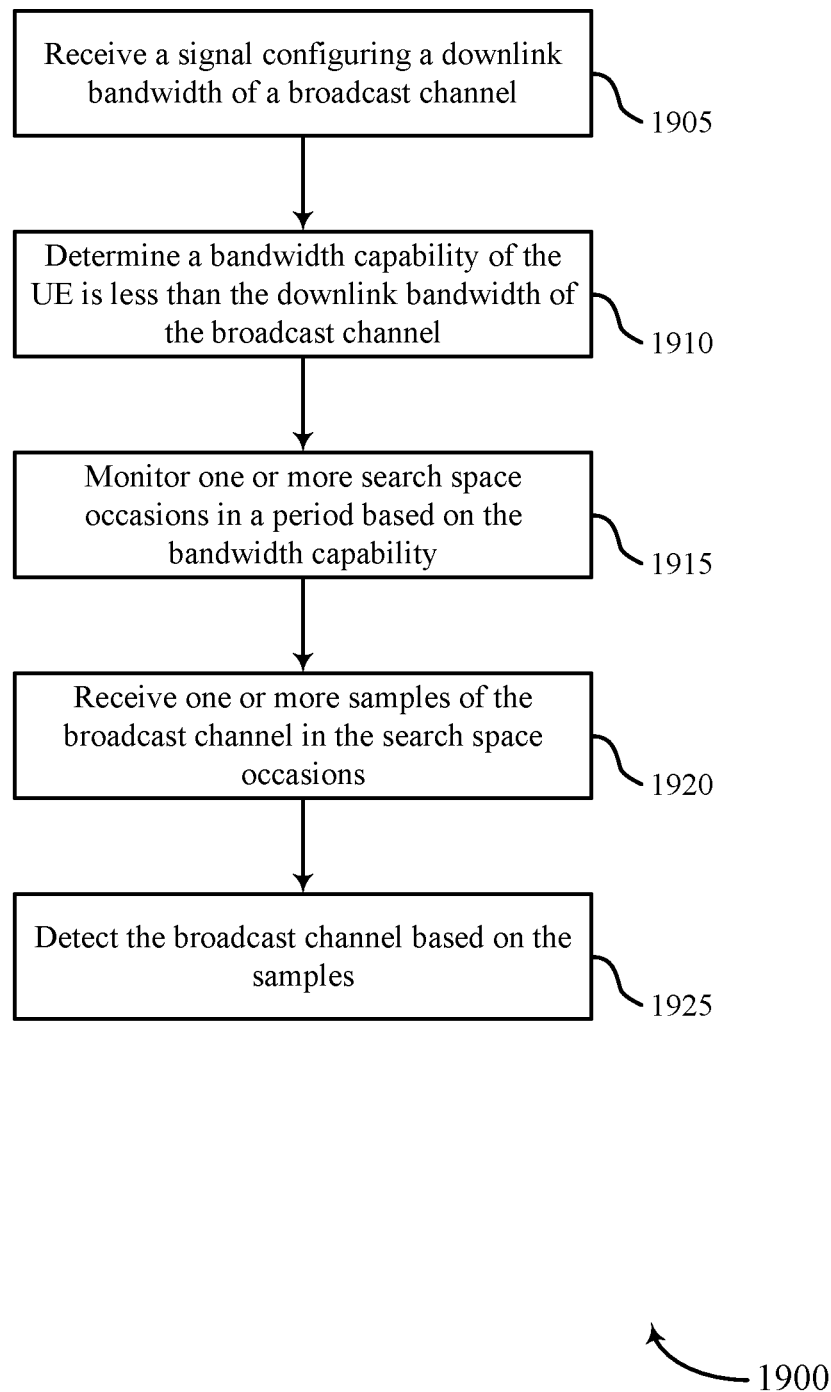
FIGS. 19 through 28 show flowcharts illustrating methods that support managing broadcast channels based on bandwidth in accordance with aspects of the present disclosure.

FIG. 19 shows a flowchart illustrating a method 1900 that supports managing broadcast channels based on bandwidth in accordance with aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 1905, the UE may receive a signal configuring a downlink bandwidth of a broadcast channel. The operations of 1905 may be performed according to the methods described herein. In some examples, aspects of the operations of 1905 may be performed by a signal manager as described with reference to FIGS. 11 through 14.

At 1910, the UE may determine a bandwidth capability of the UE is less than the downlink bandwidth of the broadcast channel. The operations of 1910 may be performed according to the methods described herein. In some examples, aspects of the operations of 1910 may be performed by a bandwidth module as described with reference to FIGS. 11 through 14.

At 1915, the UE may monitor one or more search space occasions in a period based on the bandwidth capability. The operations of 1915 may be performed according to the methods described herein. In some examples, aspects of the operations of 1915 may be performed by a monitoring component as described with reference to FIGS. 11 through 14.

At 1920, the UE may receive one or more samples of the broadcast channel in the search space occasions. The operations of 1920 may be performed according to the methods described herein. In some examples, aspects of the operations of 1920 may be performed by a bandwidth module as described with reference to FIGS. 11 through 14.

At 1925, the UE may detect the broadcast channel based on the samples. The operations of 1925 may be performed according to the methods described herein. In some examples, aspects of the operations of 1925 may be performed by a decoder as described with reference to FIGS. 11 through 14.

Figure 20:
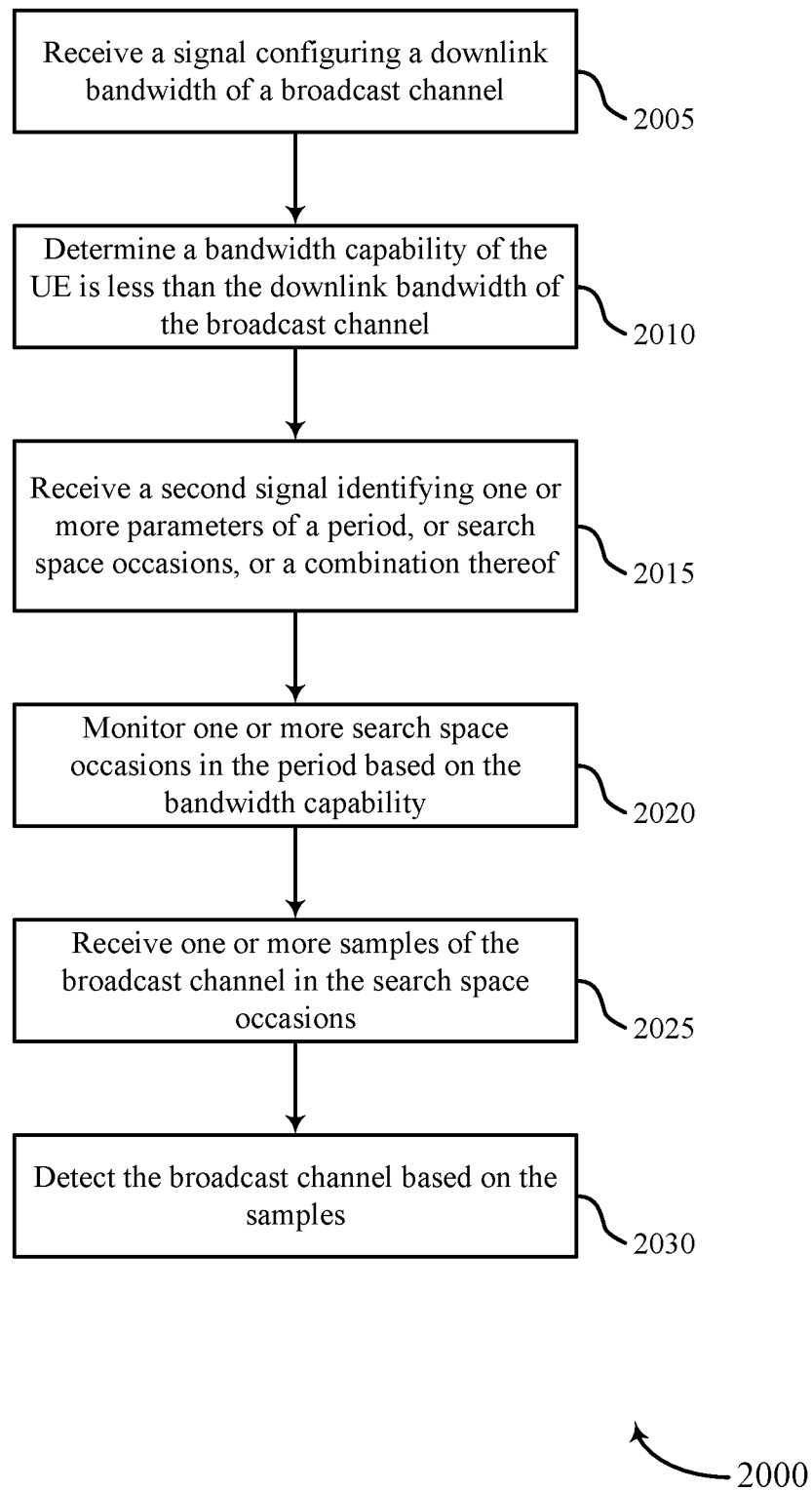

FIG. 20 shows a flowchart illustrating a method 2000 that supports managing broadcast channels based on bandwidth in accordance with aspects of the present disclosure. The operations of method 2000 may be implemented by a UE 115 or its components as described herein. For example, the operations of method 2000 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2005, the UE may receive a signal configuring a downlink bandwidth of a broadcast channel. The operations of 2005 may be performed according to the methods described herein. In some examples, aspects of the operations of 2005 may be performed by a signal manager as described with reference to FIGS. 11 through 14.

At 2010, the UE may determine a bandwidth capability of the UE is less than the downlink bandwidth of the broadcast channel. The operations of 2010 may be performed according to the methods described herein. In some examples, aspects of the operations of 2010 may be performed by a bandwidth module as described with reference to FIGS. 11 through 14.

At 2015, the UE may receive a second signal identifying one or more parameters of a period, or search space occasions, or a combination thereof. The operations of 2015 may be performed according to the methods described herein. In some examples, aspects of the operations of 2015 may be performed by a signal manager as described with reference to FIGS. 11 through 14.

At 2020, the UE may monitor one or more search space occasions in the period based on the bandwidth capability. The operations of 2020 may be performed according to the methods described herein. In some examples, aspects of the operations of 2020 may be performed by a monitoring component as described with reference to FIGS. 11 through 14.

At 2025, the UE may receive one or more samples of the broadcast channel in the search space occasions. The operations of 2025 may be performed according to the methods described herein. In some examples, aspects of the operations of 2025 may be performed by a bandwidth module as described with reference to FIGS. 11 through 14.

At 2030, the UE may detect the broadcast channel based on the samples. The operations of 2030 may be performed according to the methods described herein. In some examples, aspects of the operations of 2030 may be performed by a decoder as described with reference to FIGS. 11 through 14.

Figure 21:
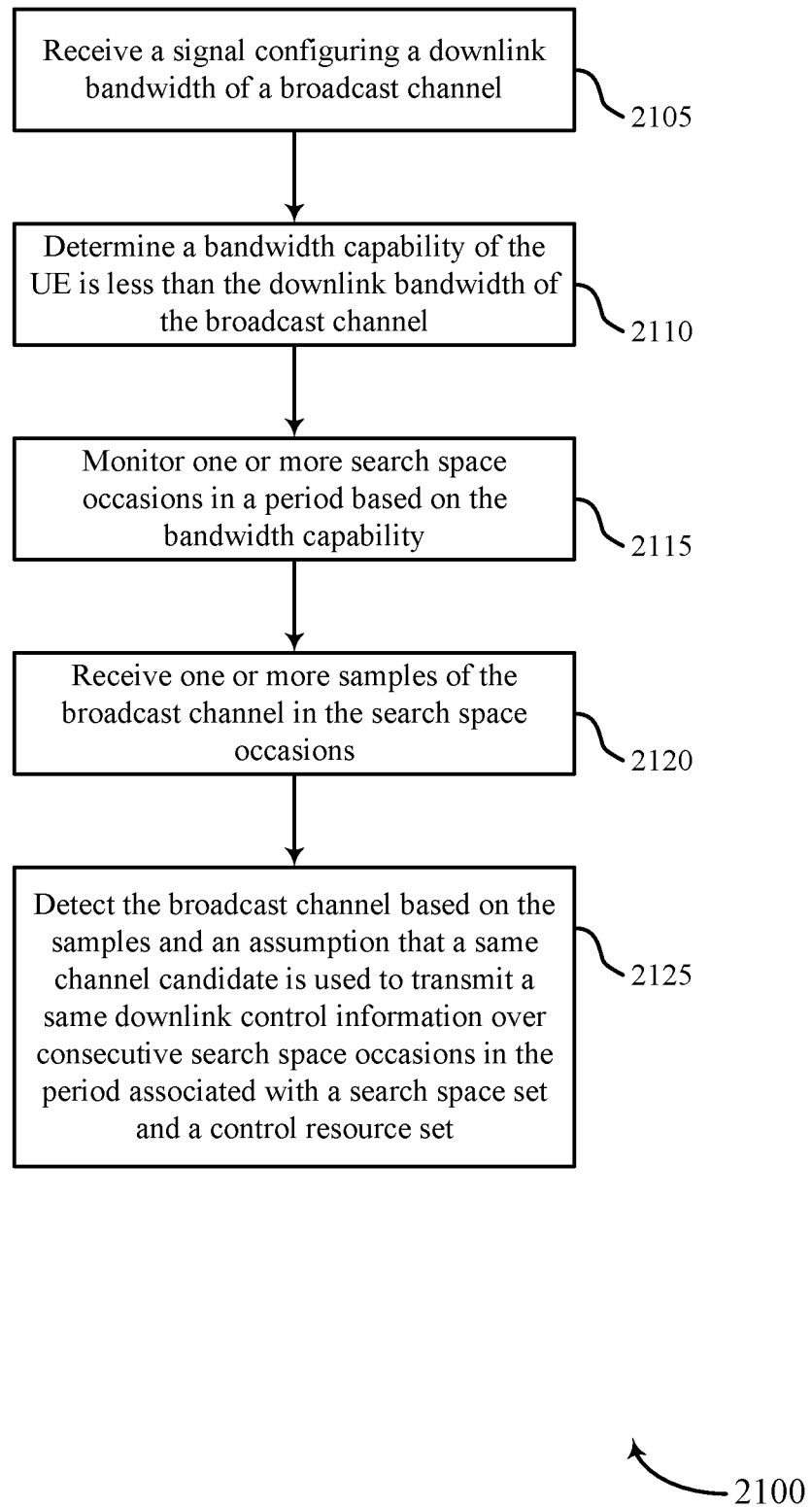

FIG. 21 shows a flowchart illustrating a method 2100 that supports managing broadcast channels based on bandwidth in accordance with aspects of the present disclosure. The operations of method 2100 may be implemented by a UE 115 or its components as described herein. For example, the operations of method 2100 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2105, the UE may receive a signal configuring a downlink bandwidth of a broadcast channel. The operations of 2105 may be performed according to the methods described herein. In some examples, aspects of the operations of 2105 may be performed by a signal manager as described with reference to FIGS. 11 through 14.

At 2110, the UE may determine a bandwidth capability of the UE is less than the downlink bandwidth of the broadcast channel. The operations of 2110 may be performed according to the methods described herein. In some examples, aspects of the operations of 2110 may be performed by a bandwidth module as described with reference to FIGS. 11 through 14.

At 2115, the UE may monitor one or more search space occasions in a period based on the bandwidth capability. The operations of 2115 may be performed according to the methods described herein. In some examples, aspects of the operations of 2115 may be performed by a monitoring component as described with reference to FIGS. 11 through 14.

At 2120, the UE may receive one or more samples of the broadcast channel in the search space occasions. The operations of 2120 may be performed according to the methods described herein. In some examples, aspects of the operations of 2120 may be performed by a bandwidth module as described with reference to FIGS. 11 through 14.

At 2125, the UE may detect the broadcast channel based on the samples and an assumption that a same channel candidate is used to transmit a same downlink control information over consecutive search space occasions in the period associated with a search space set and a control resource set. The operations of 2125 may be performed according to the methods described herein. In some examples, aspects of the operations of 2125 may be performed by a decoder as described with reference to FIGS. 11 through 14.

Figure 22:
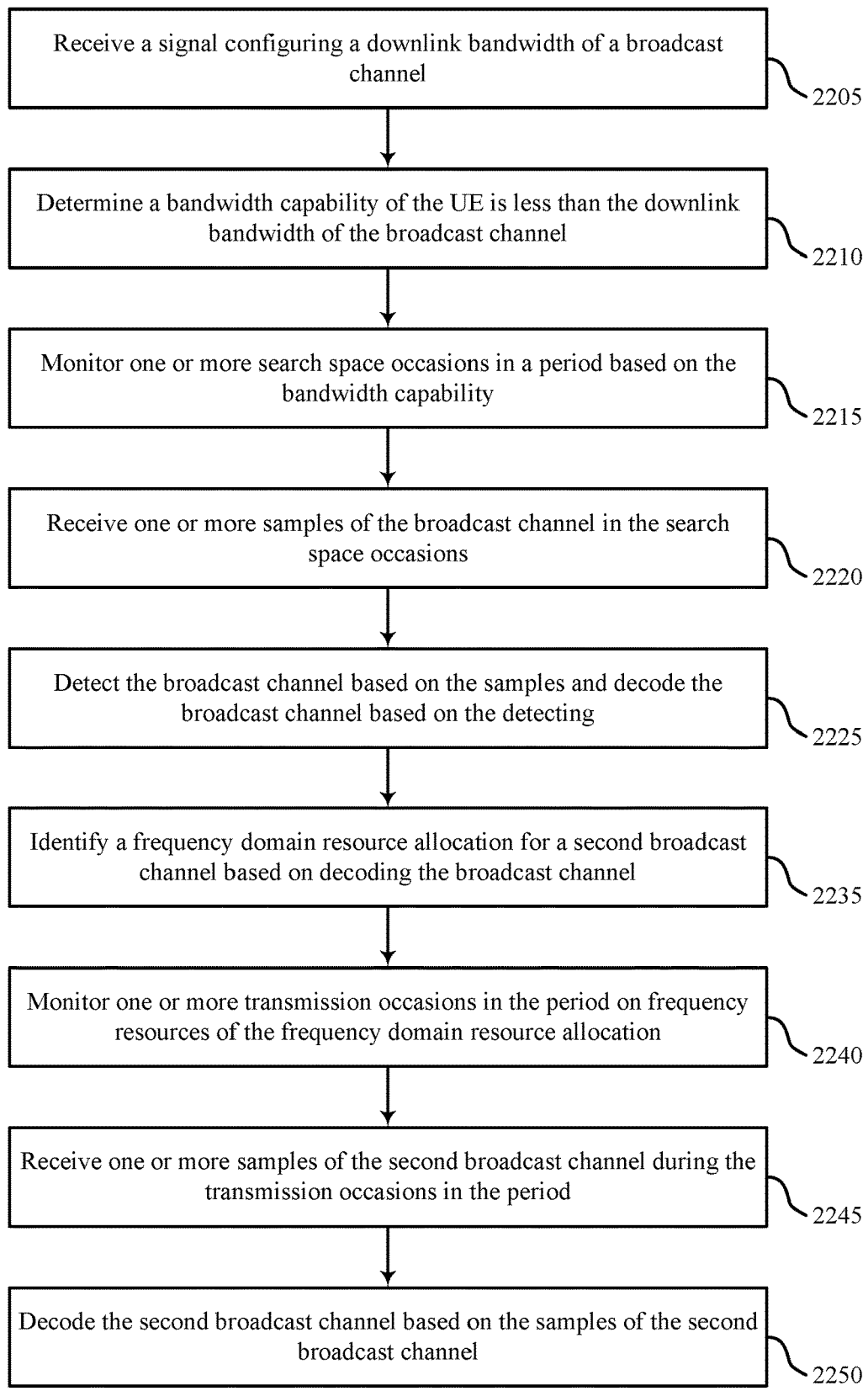

FIG. 22 shows a flowchart illustrating a method 2200 that supports managing broadcast channels based on bandwidth in accordance with aspects of the present disclosure. The operations of method 2200 may be implemented by a UE 115 or its components as described herein. For example, the operations of method 2200 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2205, the UE may receive a signal configuring a downlink bandwidth of a broadcast channel. The operations of 2205 may be performed according to the methods described herein. In some examples, aspects of the operations of 2205 may be performed by a signal manager as described with reference to FIGS. 11 through 14.

At 2210, the UE may determine a bandwidth capability of the UE is less than the downlink bandwidth of the broadcast channel. The operations of 2210 may be performed according to the methods described herein. In some examples, aspects of the operations of 2210 may be performed by a bandwidth module as described with reference to FIGS. 11 through 14.

At 2215, the UE may monitor one or more search space occasions in a period based on the bandwidth capability. The operations of 2215 may be performed according to the methods described herein. In some examples, aspects of the operations of 2215 may be performed by a monitoring component as described with reference to FIGS. 11 through 14.

At 2220, the UE may receive one or more samples of the broadcast channel in the search space occasions. The operations of 2220 may be performed according to the methods described herein. In some examples, aspects of the operations of 2220 may be performed by a bandwidth module as described with reference to FIGS. 11 through 14.

At 2225, the UE may detect the broadcast channel based on the samples and decode the broadcast channel based on the detecting. The operations of 2225 may be performed according to the methods described herein. In some examples, aspects of the operations of 2225 may be performed by a decoder as described with reference to FIGS. 11 through 14.

At 2235, the UE may identify a frequency domain resource allocation for a second broadcast channel based on decoding the broadcast channel. The operations of 2235 may be performed according to the methods described herein. In some examples, aspects of the operations of 2235 may be performed by a decoder as described with reference to FIGS. 11 through 14.

At 2240, the UE may monitor one or more transmission occasions in the period on frequency resources of the frequency domain resource allocation. The operations of 2240 may be performed according to the methods described herein. In some examples, aspects of the operations of 2240 may be performed by a monitoring component as described with reference to FIGS. 11 through 14.

At 2245, the UE may receive one or more samples of the second broadcast channel in the transmission occasions in the period. The operations of 2245 may be performed according to the methods described herein. In some examples, aspects of the operations of 2245 may be performed by a bandwidth module as described with reference to FIGS. 11 through 14.

At 2250, the UE may decode the second broadcast channel based on the samples of the second broadcast channel. The operations of 2250 may be performed according to the methods described herein. In some examples, aspects of the operations of 2250 may be performed by a decoder as described with reference to FIGS. 11 through 14.

Figure 23:
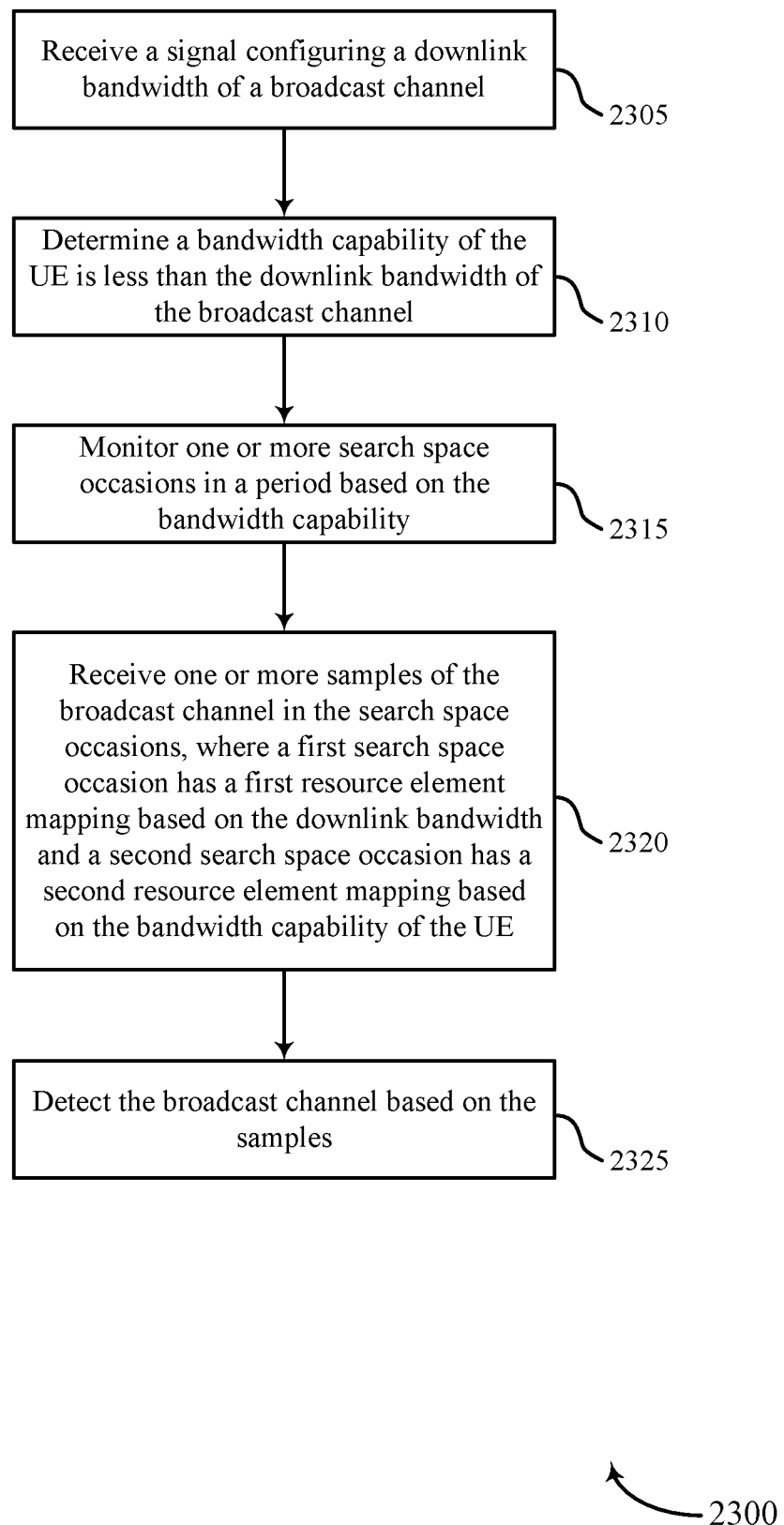

FIG. 23 shows a flowchart illustrating a method 2300 that supports managing broadcast channels based on bandwidth in accordance with aspects of the present disclosure. The operations of method 2300 may be implemented by a UE 115 or its components as described herein. For example, the operations of method 2300 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2305, the UE may receive a signal configuring a downlink bandwidth of a broadcast channel. The operations of 2305 may be performed according to the methods described herein. In some examples, aspects of the operations of 2305 may be performed by a signal manager as described with reference to FIGS. 11 through 14.

At 2310, the UE may determine a bandwidth capability of the UE is less than the downlink bandwidth of the broadcast channel. The operations of 2310 may be performed according to the methods described herein. In some examples, aspects of the operations of 2310 may be performed by a bandwidth module as described with reference to FIGS. 11 through 14.

At 2315, the UE may monitor one or more search space occasions in a period based on the bandwidth capability. The operations of 2315 may be performed according to the methods described herein. In some examples, aspects of the operations of 2315 may be performed by a monitoring component as described with reference to FIGS. 11 through 14.

At 2320, the UE may receive one or more samples of the broadcast channel in the search space occasions, where a first search space occasion has a first resource element mapping based on the downlink bandwidth and a second search space occasion has a second resource element mapping based on the bandwidth capability of the UE. The operations of 2320 may be performed according to the methods described herein. In some examples, aspects of the operations of 2320 may be performed by a bandwidth module and a decoder as described with reference to FIGS. 11 through 14.

At 2325, the UE may detect the broadcast channel based on the samples. The operations of 2325 may be performed according to the methods described herein. In some examples, aspects of the operations of 2325 may be performed by a decoder as described with reference to FIGS. 11 through 14.

Figure 24:
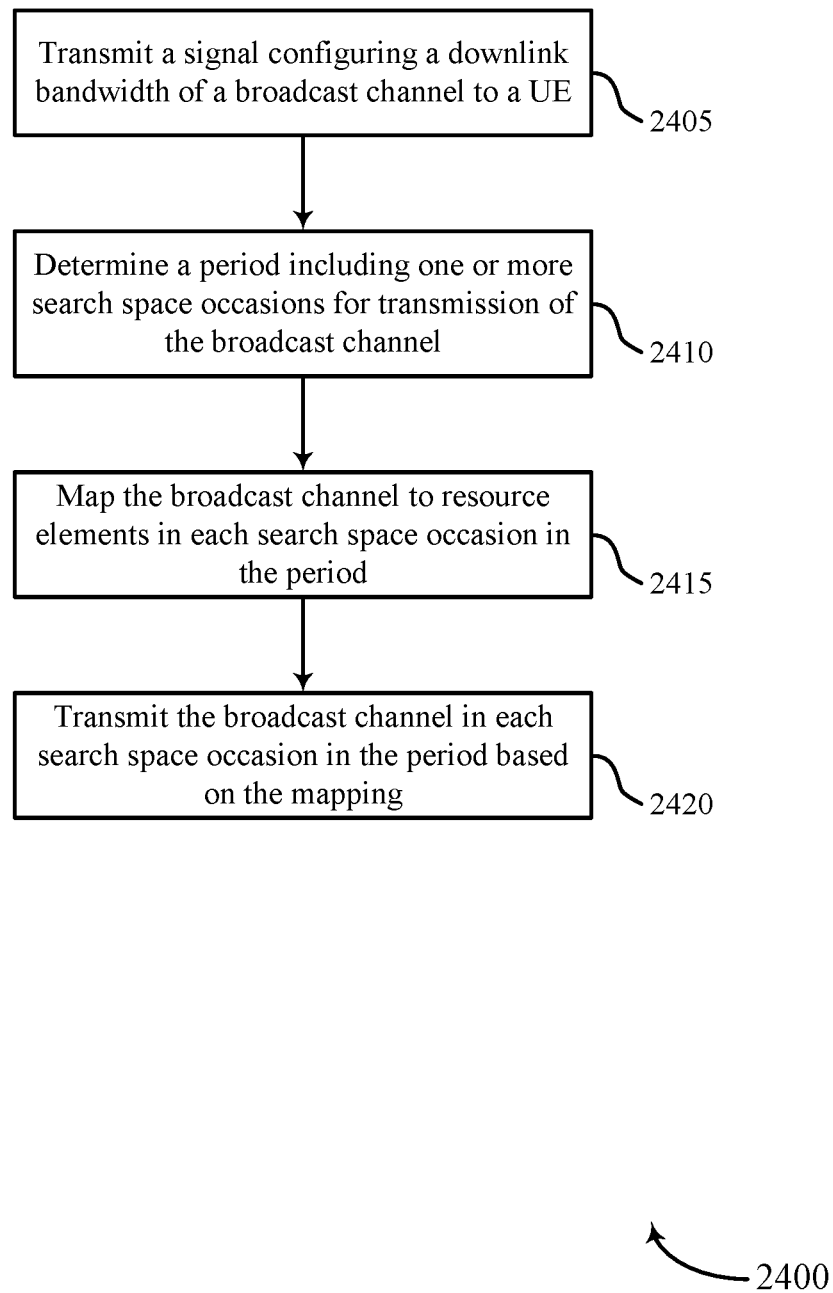

FIG. 24 shows a flowchart illustrating a method 2400 that supports managing broadcast channels based on bandwidth in accordance with aspects of the present disclosure. The operations of method 2400 may be implemented by a base station 105 or its components as described herein. For example, the operations of method 2400 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2405, the base station may transmit a signal configuring a downlink bandwidth of a broadcast channel to a UE. The operations of 2405 may be performed according to the methods described herein. In some examples, aspects of the operations of 2405 may be performed by a signal transmission component as described with reference to FIGS. 15 through 18.

At 2410, the base station may determine a period including one or more search space occasions for transmission of the broadcast channel. The operations of 2410 may be performed according to the methods described herein. In some examples, aspects of the operations of 2410 may be performed by a timing manager as described with reference to FIGS. 15 through 18.

At 2415, the base station may map the broadcast channel to resource elements in each search space occasion in the period. The operations of 2415 may be performed according to the methods described herein. In some examples, aspects of the operations of 2415 may be performed by a mapper as described with reference to FIGS. 15 through 18.

At 2420, the base station may transmit the broadcast channel in each search space occasion in the period based on the mapping. The operations of 2420 may be performed according to the methods described herein. In some examples, aspects of the operations of 2420 may be performed by a channel transmission manager as described with reference to FIGS. 15 through 18.

Figure 25:
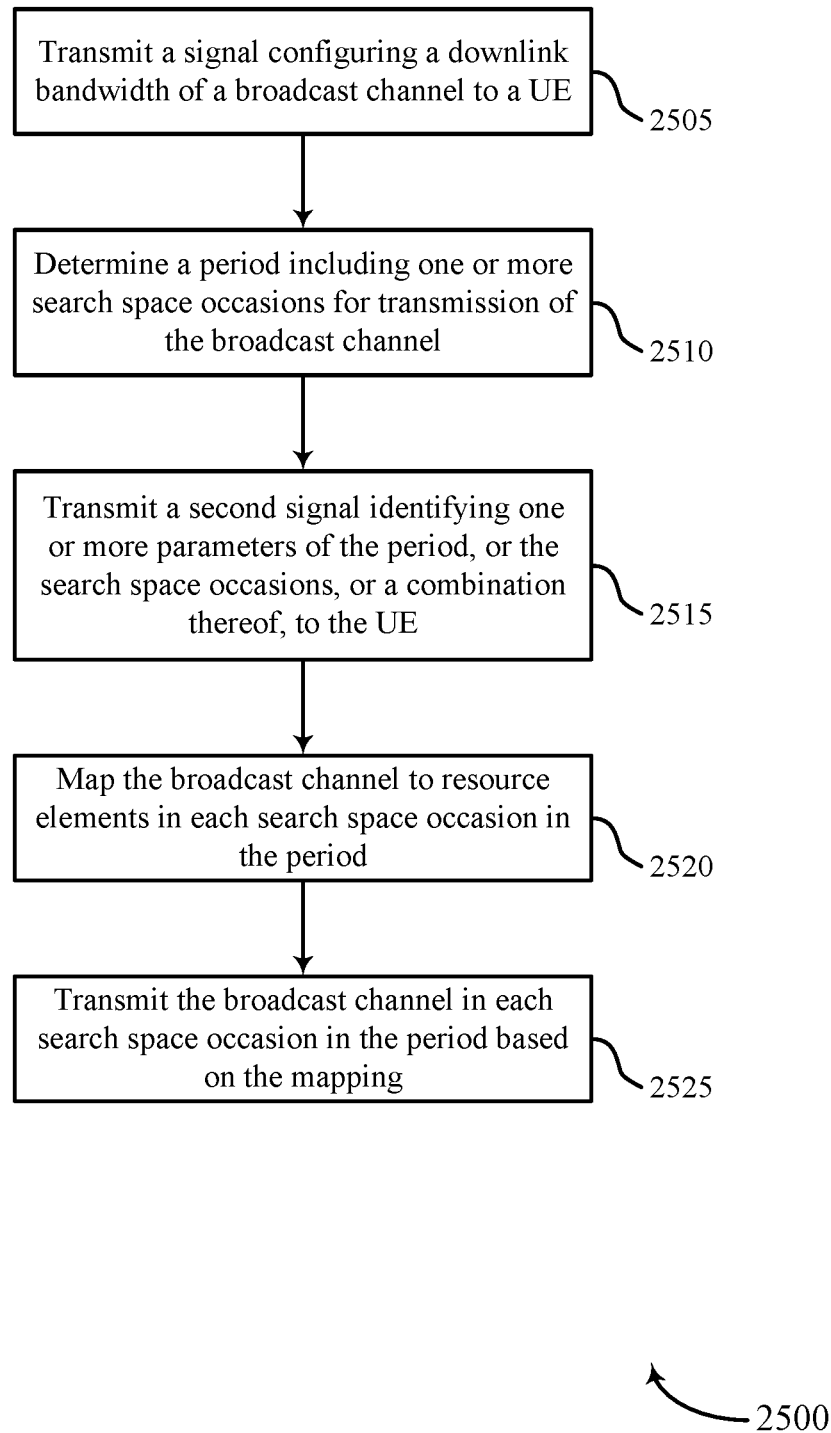

FIG. 25 shows a flowchart illustrating a method 2500 that supports managing broadcast channels based on bandwidth in accordance with aspects of the present disclosure. The operations of method 2500 may be implemented by a base station 105 or its components as described herein. For example, the operations of method 2500 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2505, the base station may transmit a signal configuring a downlink bandwidth of a broadcast channel to a UE. The operations of 2505 may be performed according to the methods described herein. In some examples, aspects of the operations of 2505 may be performed by a signal transmission component as described with reference to FIGS. 15 through 18.

At 2510, the base station may determine a period including one or more search space occasions for transmission of the broadcast channel. The operations of 2510 may be performed according to the methods described herein. In some examples, aspects of the operations of 2510 may be performed by a timing manager as described with reference to FIGS. 15 through 18.

At 2515, the base station may transmit a second signal identifying one or more parameters of the period, or the search space occasions, or a combination thereof, to the UE. The operations of 2515 may be performed according to the methods described herein. In some examples, aspects of the operations of 2515 may be performed by a signal transmission component as described with reference to FIGS. 15 through 18.

At 2520, the base station may map the broadcast channel to resource elements in each search space occasion in the period. The operations of 2520 may be performed according to the methods described herein. In some examples, aspects of the operations of 2520 may be performed by a mapper as described with reference to FIGS. 15 through 18.

At 2525, the base station may transmit the broadcast channel in each search space occasion in the period based on the mapping. The operations of 2525 may be performed according to the methods described herein. In some examples, aspects of the operations of 2525 may be performed by a channel transmission manager as described with reference to FIGS. 15 through 18.

Figure 26:
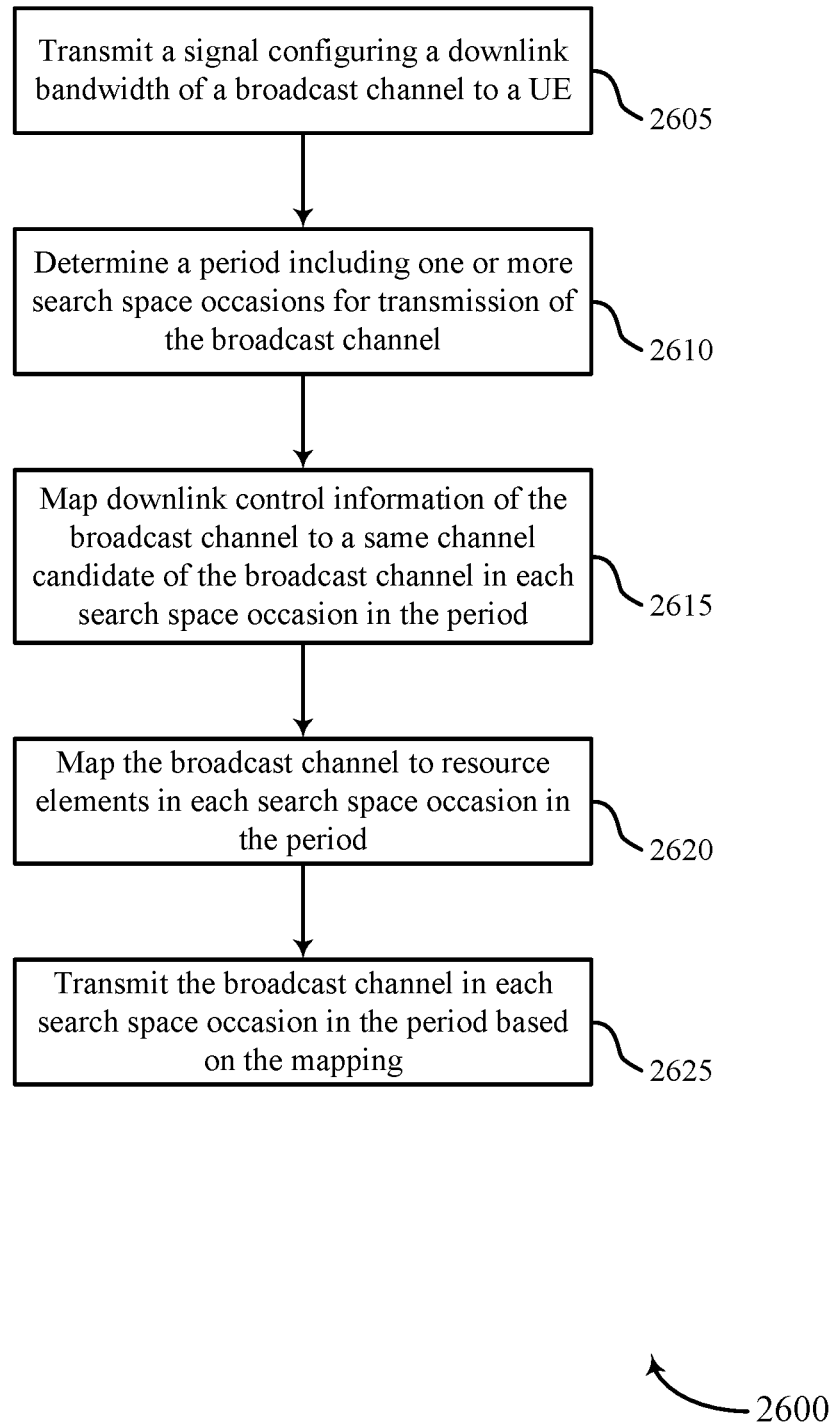

FIG. 26 shows a flowchart illustrating a method 2600 that supports managing broadcast channels based on bandwidth in accordance with aspects of the present disclosure. The operations of method 2600 may be implemented by a base station 105 or its components as described herein. For example, the operations of method 2600 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2605, the base station may transmit a signal configuring a downlink bandwidth of a broadcast channel to a UE. The operations of 2605 may be performed according to the methods described herein. In some examples, aspects of the operations of 2605 may be performed by a signal transmission component as described with reference to FIGS. 15 through 18.

At 2610, the base station may determine a period including one or more search space occasions for transmission of the broadcast channel. The operations of 2610 may be performed according to the methods described herein. In some examples, aspects of the operations of 2610 may be performed by a timing manager as described with reference to FIGS. 15 through 18.

At 2615, the base station may map downlink control information of the broadcast channel to a same channel candidate of the broadcast channel in each search space occasion in the period. The operations of 2615 may be performed according to the methods described herein. In some examples, aspects of the operations of 2615 may be performed by a mapper as described with reference to FIGS. 15 through 18.

At 2620, the base station may map the broadcast channel to resource elements in each search space occasion in the period. The operations of 2620 may be performed according to the methods described herein. In some examples, aspects of the operations of 2620 may be performed by a mapper as described with reference to FIGS. 15 through 18.

At 2625, the base station may transmit the broadcast channel in each search space occasion in the period based on the mapping. The operations of 2625 may be performed according to the methods described herein. In some examples, aspects of the operations of 2625 may be performed by a channel transmission manager as described with reference to FIGS. 15 through 18.

Figure 27:
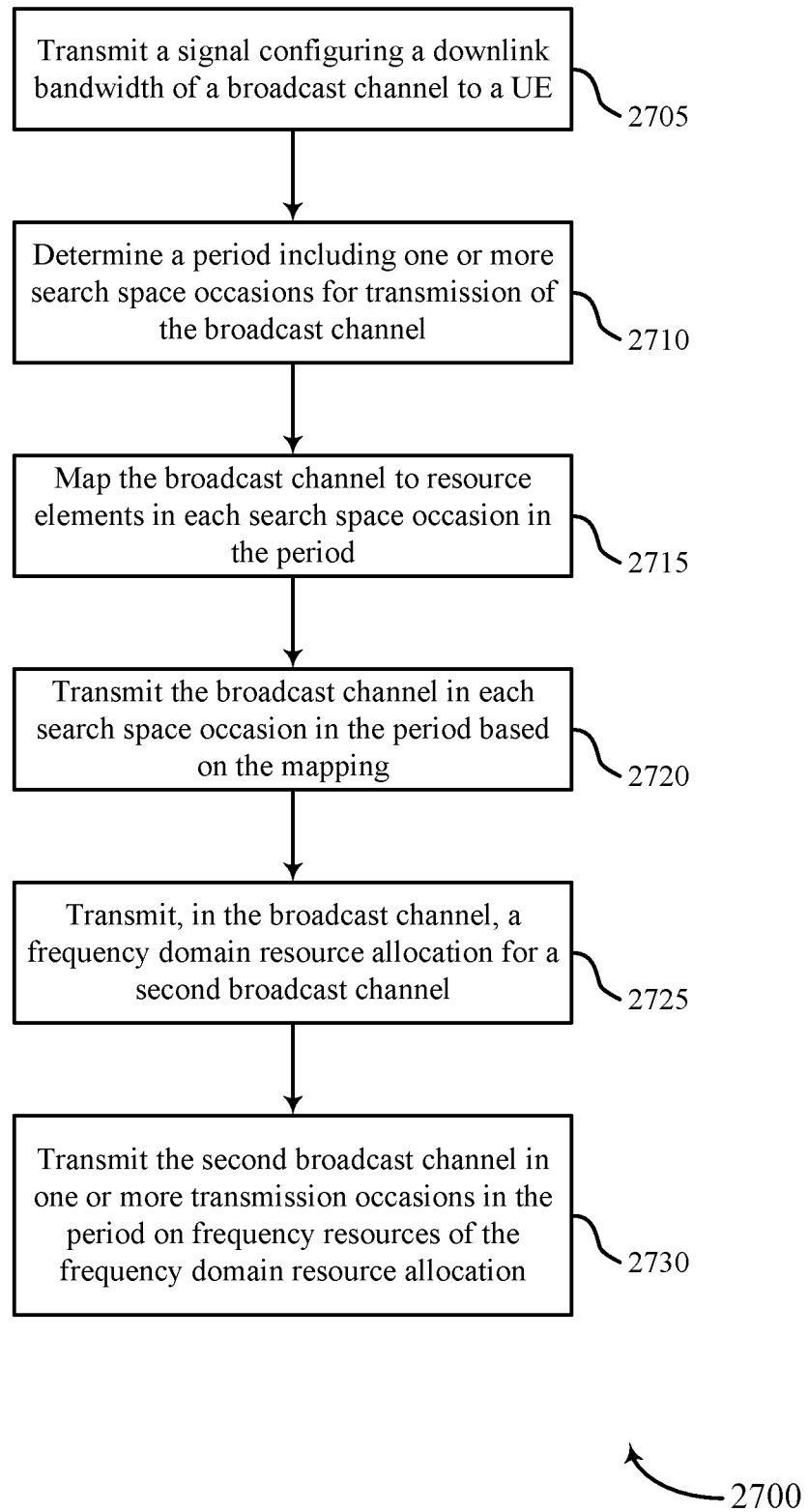

FIG. 27 shows a flowchart illustrating a method 2700 that supports managing broadcast channels based on bandwidth in accordance with aspects of the present disclosure. The operations of method 2700 may be implemented by a base station 105 or its components as described herein. For example, the operations of method 2700 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2705, the base station may transmit a signal configuring a downlink bandwidth of a broadcast channel to a UE. The operations of 2705 may be performed according to the methods described herein. In some examples, aspects of the operations of 2705 may be performed by a signal transmission component as described with reference to FIGS. 15 through 18.

At 2710, the base station may determine a period including one or more search space occasions for transmission of the broadcast channel. The operations of 2710 may be performed according to the methods described herein. In some examples, aspects of the operations of 2710 may be performed by a timing manager as described with reference to FIGS. 15 through 18.

At 2715, the base station may map the broadcast channel to resource elements in each search space occasion in the period. The operations of 2715 may be performed according to the methods described herein. In some examples, aspects of the operations of 2715 may be performed by a mapper as described with reference to FIGS. 15 through 18.

At 2720, the base station may transmit the broadcast channel in each search space occasion in the period based on the mapping. The operations of 2720 may be performed according to the methods described herein. In some examples, aspects of the operations of 2720 may be performed by a channel transmission manager as described with reference to FIGS. 15 through 18.

At 2725, the base station may transmit, in the broadcast channel, a frequency domain resource allocation for a second broadcast channel. The operations of 2725 may be performed according to the methods described herein. In some examples, aspects of the operations of 2725 may be performed by a channel transmission manager as described with reference to FIGS. 15 through 18.

At 2730, the base station may transmit the second broadcast channel in one or more transmission occasions in the period on frequency resources of the frequency domain resource allocation. The operations of 2730 may be performed according to the methods described herein. In some examples, aspects of the operations of 2730 may be performed by a channel transmission manager as described with reference to FIGS. 15 through 18.

Figure 28:
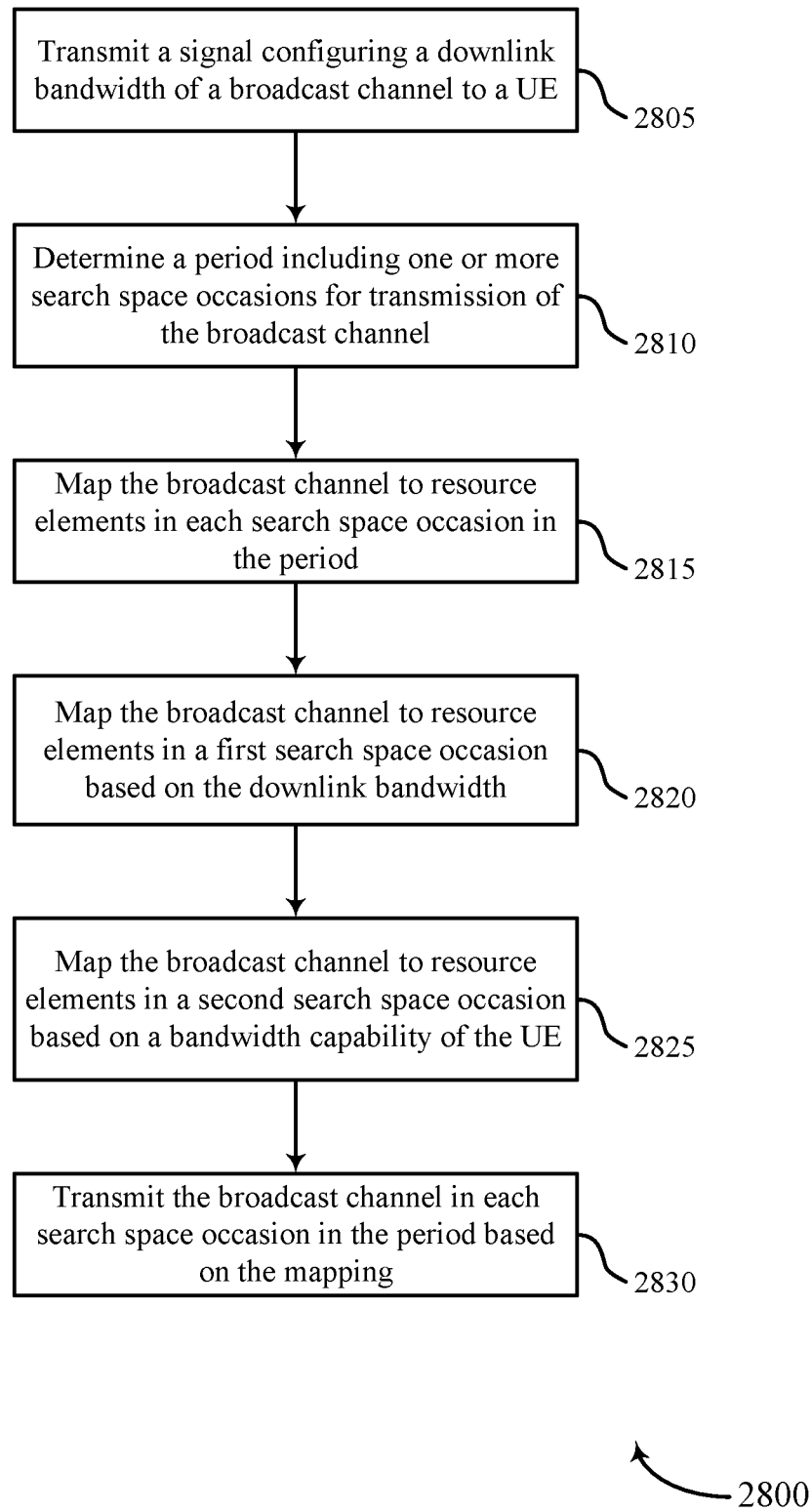

FIG. 28 shows a flowchart illustrating a method 2800 that supports managing broadcast channels based on bandwidth in accordance with aspects of the present disclosure. The operations of method 2800 may be implemented by a base station 105 or its components as described herein. For example, the operations of method 2800 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2805, the base station may transmit a signal configuring a downlink bandwidth of a broadcast channel to a UE. The operations of 2805 may be performed according to the methods described herein. In some examples, aspects of the operations of 2805 may be performed by a signal transmission component as described with reference to FIGS. 15 through 18.

At 2810, the base station may determine a period including one or more search space occasions for transmission of the broadcast channel. The operations of 2810 may be performed according to the methods described herein. In some examples, aspects of the operations of 2810 may be performed by a timing manager as described with reference to FIGS. 15 through 18.

At 2815, the base station may map the broadcast channel to resource elements in each search space occasion in the period. The operations of 2815 may be performed according to the methods described herein. In some examples, aspects of the operations of 2815 may be performed by a mapper as described with reference to FIGS. 15 through 18.

At 2820, the base station may map the broadcast channel to resource elements in a first search space occasion based on the downlink bandwidth. The operations of 2820 may be performed according to the methods described herein. In some examples, aspects of the operations of 2820 may be performed by a mapper as described with reference to FIGS. 15 through 18.

At 2825, the base station may map the broadcast channel to resource elements in a second search space occasion based on a bandwidth capability of the UE. The operations of 2825 may be performed according to the methods described herein. In some examples, aspects of the operations of 2825 may be performed by a mapper as described with reference to FIGS. 15 through 18.

At 2830, the base station may transmit the broadcast channel in each search space occasion in the period based on the mapping. The operations of 2830 may be performed according to the methods described herein. In some examples, aspects of the operations of 2830 may be performed by a channel transmission manager as described with reference to FIGS. 15 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a signal configuring a downlink bandwidth of a broadcast channel;
   determining a bandwidth capability of the UE is less than the downlink bandwidth of the broadcast channel;
   monitoring a plurality of search space occasions in a period based at least in part on the bandwidth capability being less than the downlink bandwidth of the broadcast channel;
   receiving a plurality of samples of the broadcast channel in the plurality of search space occasions based at least in part on determining that a repetition of the broadcast channel are to be received in each of the plurality of search space occasions; and
   detecting the broadcast channel based at least in part on the plurality of samples of the broadcast channel.

2. The method of claim 1, wherein receiving the plurality of samples comprises:
   receiving a first sample in a first subband of the downlink bandwidth in a first search space occasion; and
   receiving a second sample in a second subband of the downlink bandwidth in a second search space occasion, wherein the first subband fails to overlap the second subband.

3. The method of claim 1, further comprising:
   receiving a second signal identifying one or more parameters of the period, or the plurality of search space occasions, or a combination thereof.

4. The method of claim 1, wherein detecting the broadcast channel further comprises:
   detecting the broadcast channel based at least in part on an assumption that a same channel candidate is used to transmit a same downlink control information over consecutive search space occasions in the period associated with a search space set and a control resource set.

5. The method of claim 1, further comprising:
   decoding the broadcast channel based at least in part on the detecting.

6. The method of claim 5, further comprising:
   identifying a frequency domain resource allocation for a second broadcast channel based at least in part on decoding the broadcast channel;
   monitoring one or more transmission occasions in the period on frequency resources of the frequency domain resource allocation;
   receiving one or more samples of the second broadcast channel in the one or more transmission occasions in the period; and
   decoding the second broadcast channel based at least in part on the one or more samples of the second broadcast channel.

7. The method of claim 6, further comprising:
   identifying one or more parameters associated with the one or more transmission occasions, wherein the one or more parameters comprise a transport block size, a channel coding, a redundancy version, or a combination thereof.

8. The method of claim 7, further comprising:
   descrambling a log-likelihood ratio associated with the second broadcast channel based at least in part on the one or more parameters.

9. The method of claim 6, wherein receiving the one or more samples of the second broadcast channel comprises:
   receiving a first sample in a first subband of the frequency resources in a first transmission occasion; and receiving a second sample in a second subband of the frequency resources in a second transmission occasion, wherein the first subband fails to overlap the second subband.

10. The method of claim 6, further comprising:
identifying a duration between transmitting a first search space occasion and a first transmission occasion based at least in part on decoding the broadcast channel.

11. The method of claim 6, wherein receiving the one or more samples of the second broadcast channel comprises:
receiving the one or more samples of the second broadcast channel based at least in part on an assumption that consecutive transmission occasions in the period are transmitted in the frequency domain resource allocation for the second broadcast channel.

12. The method of claim 6, wherein decoding the second broadcast channel further comprises:
decoding the second broadcast channel based at least in part on an assumption that the second broadcast channel is repeatedly transmitted over consecutive transmission occasions in the period.

13. The method of claim 6, wherein the second broadcast channel comprises a broadcast physical downlink shared channel (PDSCH).

14. The method of claim 1, wherein the plurality of search space occasions are associated with a control resource set, a search space set, or a combination thereof.

15. The method of claim 14, wherein detecting the broadcast channel further comprises:
detecting the broadcast channel based at least in part on channel candidates associated with the control resource set, the search space set, or a combination thereof.

16. The method of claim 1, wherein:
a first search space occasion has a first resource element mapping based at least in part on the downlink bandwidth; and
a second search space occasion has a second resource element mapping based at least in part on the bandwidth capability of the UE.

17. The method of claim 1, wherein the period is based at least in part on a quantity of the plurality of search space occasions, a system information modification period, a discontinuous reception cycle for paging, the downlink bandwidth, a random access channel (RACH) configuration period, a RACH configuration association period, or a combination thereof.

18. The method of claim 1, wherein the broadcast channel comprises a broadcast physical downlink control channel (PDCCH).

19. The method of claim 1, wherein the signal comprises a master information block (MIB) or a system information block (SIB).

20. The method of claim 1, wherein the broadcast channel indicates system information, paging information, one or more messages in a random access channel (RACH) procedure, or a combination thereof.

21. A method for wireless communications, comprising:
transmitting a signal configuring a downlink bandwidth of a broadcast channel to a user equipment (UE);
determining a period comprising a plurality of search space occasions for transmission of the broadcast channel;
mapping the broadcast channel to resource elements in each search space occasion of the plurality of search space occasions in the period; and
transmitting the broadcast channel in each search space occasion of the plurality of search space occasions in the period based at least in part on the mapping, wherein a repetition of the broadcast channel is transmitted in each of the plurality of search space occasions.

22. The method of claim 21, further comprising:
transmitting a second signal identifying one or more parameters of the period, or the plurality of search space occasions, or a combination thereof, to the UE.

23. The method of claim 21, wherein the mapping further comprises:
mapping downlink control information of the broadcast channel to a same channel candidate of the broadcast channel in each search space occasion of the plurality of search space occasions in the period.

24. The method of claim 21, further comprising:
transmitting, in the broadcast channel, a frequency domain resource allocation for a second broadcast channel; and
transmitting the second broadcast channel in one or more transmission occasions in the period on frequency resources of the frequency domain resource allocation.

25. The method of claim 24, further comprising:
determining one or more parameters associated with the one or more transmission occasions, wherein the one or more parameters comprise a transport block size, a channel coding, a redundancy version, or a combination thereof; and
determining a duration between transmitting a first search space occasion and a first transmission occasion.

26. The method of claim 24, wherein transmitting the second broadcast channel further comprises:
transmitting consecutive transmission occasions in the period in the frequency domain resource allocation for the second broadcast channel.

27. The method of claim 24, wherein transmitting the second broadcast channel further comprises:
transmitting repetitions of the second broadcast channel in consecutive transmission occasions in the period.

28. The method of claim 21, further comprising:
mapping the broadcast channel to resource elements in a first search space occasion based at least in part on the downlink bandwidth; and
mapping the broadcast channel to resource elements in a second search space occasion based at least in part on a bandwidth capability of the UE.

29. An apparatus for wireless communications at a user equipment (UE), comprising:
a processor,
memory coupled with the processor; and
instructions stored in the memory and executable by the processor to cause the apparatus to:
receive a signal configuring a downlink bandwidth of a broadcast channel;
determine a bandwidth capability of the UE is less than the downlink bandwidth of the broadcast channel;
monitor a plurality of search space occasions in a period based at least in part on the bandwidth capability being less than the downlink bandwidth of the broadcast channel;
receive a plurality of samples of the broadcast channel in the plurality of search space occasions based at least in part on a determination that a repetition of the broadcast channel are to be received in each of the plurality of search space occasions; and
detect the broadcast channel based at least in part on the plurality of samples of the broadcast channel.

30. An apparatus for wireless communications, comprising:
- a processor,
- memory coupled with the processor; and
- instructions stored in the memory and executable by the processor to cause the apparatus to:
    - transmit a signal configuring a downlink bandwidth of a broadcast channel to a user equipment (UE);
    - determine a period comprising a plurality of search space occasions for transmission of the broadcast channel;
    - map the broadcast channel to resource elements in each search space occasion of the plurality of search space occasions in the period; and
    - transmit the broadcast channel in each search space occasion of the plurality of search space occasions in the period based at least in part on the mapping, wherein a repetition of the broadcast channel is transmitted in each of the plurality of search space occasions.

* * * * *